United States Patent
Ogura

(10) Patent No.: US 9,609,545 B2
(45) Date of Patent: Mar. 28, 2017

(54) COMMUNICATION SYSTEM AND BASE STATION DEVICE

(75) Inventor: Daisuke Ogura, Tokyo (JP)

(73) Assignee: NEC Corporation, Tokyo (JP)

( * ) Notice: Subject to any disclaimer, the term of this patent is extended or adjusted under 35 U.S.C. 154(b) by 22 days.

(21) Appl. No.: 14/128,554

(22) PCT Filed: Jun. 29, 2012

(86) PCT No.: PCT/JP2012/067255
§ 371 (c)(1),
(2), (4) Date: Dec. 20, 2013

(87) PCT Pub. No.: WO2013/005818
PCT Pub. Date: Jan. 10, 2013

(65) Prior Publication Data
US 2014/0126362 A1   May 8, 2014

(30) Foreign Application Priority Data
Jul. 1, 2011   (JP) .................................. 2011-147563

(51) Int. Cl.
*H04W 28/02* (2009.01)
*H04L 12/835* (2013.01)
*H04L 12/801* (2013.01)

(52) U.S. Cl.
CPC ......... *H04W 28/0289* (2013.01); *H04L 47/30* (2013.01); *H04W 28/0284* (2013.01); *H04L 47/14* (2013.01); *H04L 47/29* (2013.01)

(58) Field of Classification Search
None
See application file for complete search history.

(56) References Cited

U.S. PATENT DOCUMENTS 6,813,245 B1 * 11/2004 Furuno .......................... 370/236
6,990,070 B1    1/2006 Aweya et al.
(Continued)

FOREIGN PATENT DOCUMENTS

EP    1 739 896 A1    1/2007
EP    2 175 677 A1    4/2010
(Continued)

OTHER PUBLICATIONS

International Search Report (ISR) (PCT Form PCT/ISA/210), in PCT/JP2012/067255, dated Aug. 21, 2012.
(Continued)

*Primary Examiner* — Alex Skripnikov
(74) *Attorney, Agent, or Firm* — McGinn IP Law Group, PLLC

(57) ABSTRACT

In a wireless base station device, a PDCP buffer unit temporarily stores data sent from a core network device for the purpose of sending the data to a mobile station device. A data measurement unit measures the volume of data stored in a PDCP buffer unit. On the basis of a measurement value of the data volume measured by the data measurement unit, the congestion state determination unit determines whether or not the PDCP buffer unit is in a congestion state. In the core network device, a sending data storage unit stores data to be sent to the wireless base station device. On the basis of a result of the determination by the congestion state determination unit, a transmission/reception unit sends the data stored in the sending data storage unit to the wireless base station device. In this way, loss of data communicated between the communication devices is reduced.

7 Claims, 16 Drawing Sheets

(56) References Cited

U.S. PATENT DOCUMENTS

| | | | |
|---|---|---|---|
| 2003/0099195 A1* | 5/2003 | Lee .............................. | 370/229 |
| 2003/0179720 A1* | 9/2003 | Cuny ..................... | H04L 47/14 370/310 |
| 2006/0056333 A1 | 3/2006 | Ogura | |
| 2012/0051216 A1* | 3/2012 | Zhang ..................... | H04L 47/12 370/230 |
| 2012/0201137 A1* | 8/2012 | Le Faucheur ........... | H04L 47/11 370/235 |
| 2012/0236782 A1* | 9/2012 | Bucknell et al. ............. | 370/315 |
| 2013/0258867 A1* | 10/2013 | Wanstedt .......... | H04W 28/0284 370/241 |

FOREIGN PATENT DOCUMENTS

| | | |
|---|---|---|
| JP | 2003-009208 | 1/2003 |
| JP | 2008-187486 | 8/2008 |
| JP | 2008-306383 | 12/2008 |
| JP | 2009-089270 | 4/2009 |
| WO | WO 2010/038590 A1 | 4/2010 |
| WO | WO 2010/056158 A1 | 5/2010 |
| WO | WO 2011/077065 A1 | 6/2011 |

OTHER PUBLICATIONS

3GPP TS25.323, V3.3.0 (Sep. 2000).
Japanese Office Action dated Mar. 3, 2015 with a partial English translation thereof.
Extended European Search Report dated Jan. 20, 2015.
NEC, KDDI, Deutsche Telekom, The u-plane overflowing handling, 3GPP TSG-RAN WG3#71 R3-110895, Feb. 2, 2011 <URL: http://www.3gpp.org/ftp/tsg_ran/WG3_lu/TSGR3_71/Docs/R3-110895.zip>.
Japanese Office Action dated Jan. 12, 2016 with an English translation thereof.

* cited by examiner

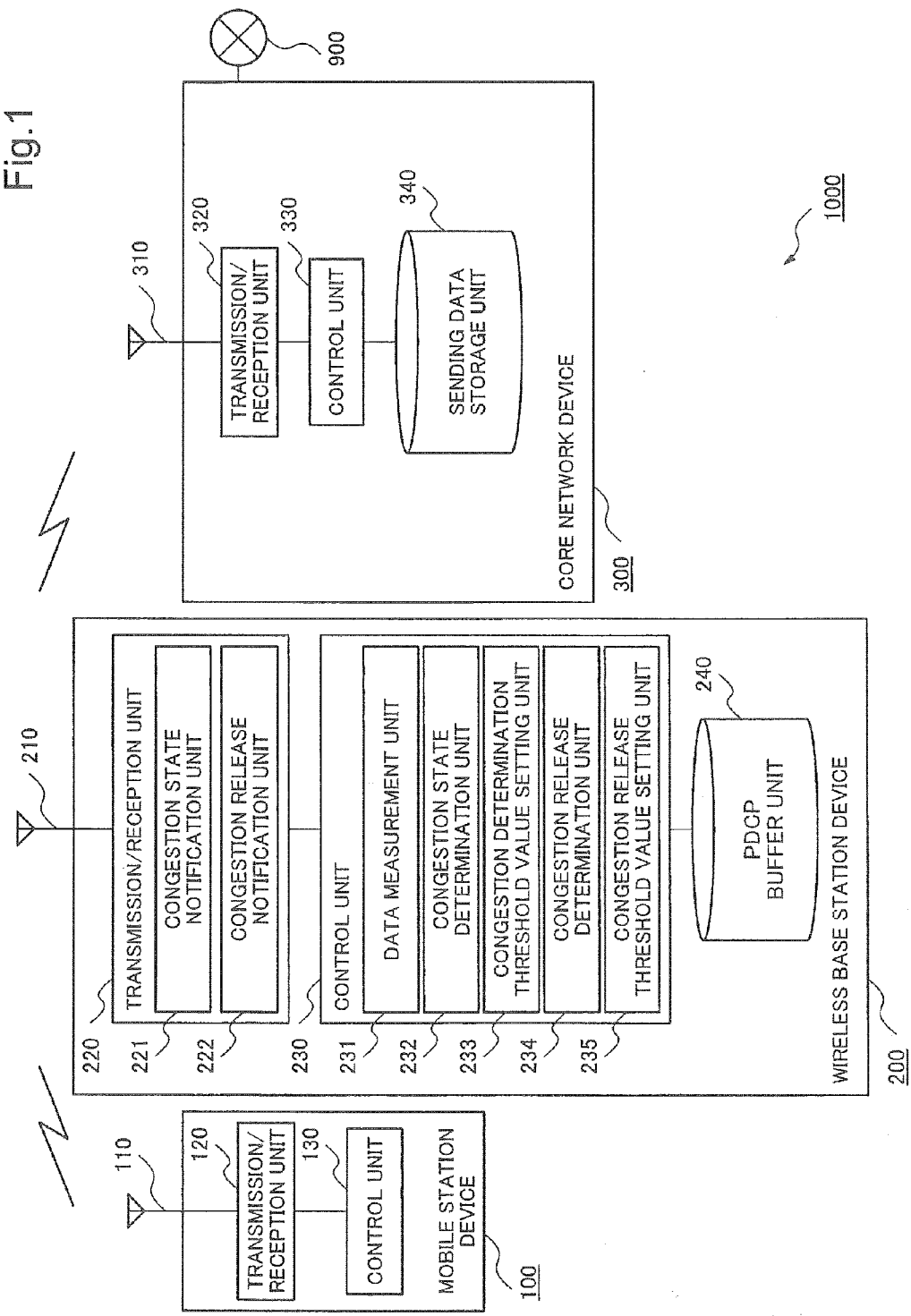

Fig.2

| CONGESTION DETERMINATION THRESHOLD VALUE | THRESHOLD VALUE FOR DETERMINING THAT PDCP BUFFER UNIT IS IN CONGESTION STATE. <br> * DETERMINED BY THE AMOUNT OF BUFFER USAGE (IN SIZE OR NUMBER) OR BUFFER UTILIZATION RATE (IN %). |
|---|---|
| CONGESTION RELEASE THRESHOLD VALUE | THRESHOLD VALUE FOR DETERMINING THAT PDCP BUFFER UNIT IS RELEASED FROM CONGESTION STATE. <br> * DETERMINED BY THE AMOUNT OF BUFFER USAGE (SIZE OR NUMBER) OR BUFFER UTILIZATION RATE. |

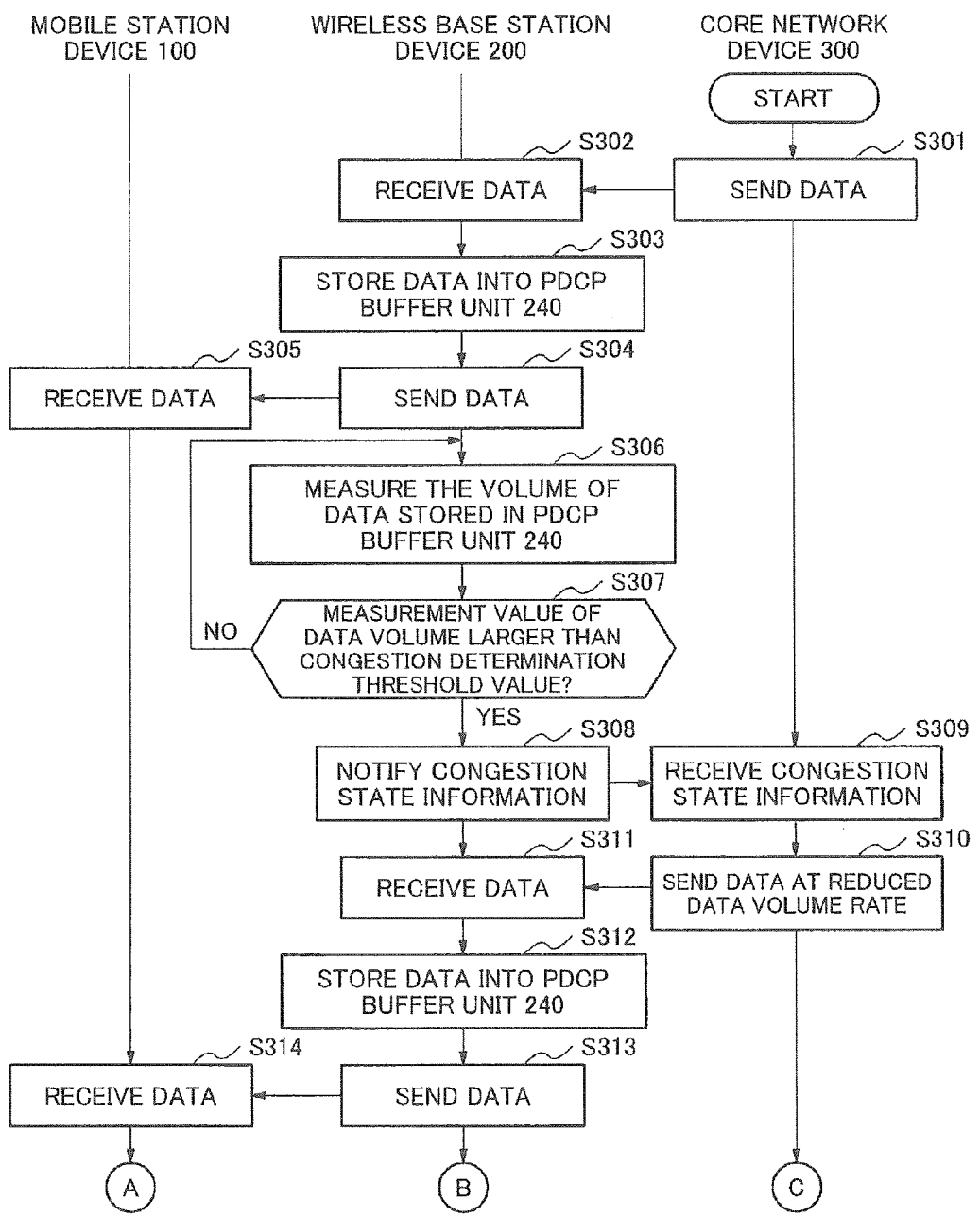

COMMUNICATION SYSTEM AND BASE STATION DEVICE

TECHNICAL FIELD

The present invention relates to a communication system and a base station device and, for example, relates to a communication system comprising a base station device and a core network device, and also to a base station device comprised in the communication system.

BACKGROUND ART

In recent years, mobile communication networks such as of cellular phones have been evolving rapidly. In particular, the third generation mobile communication systems based on W-CDMA (Wideband Code Division Multiple Access), UMTS (Universal Mobile Telecommunications System) and the like have been established rapidly in Japan and many other countries. The specifications of the third and following generation mobile communication systems are standardized by 3GPP (Third Generation Partnership Project).

In relation to the 3GPP standards, Non-patent Document 1 describes regulations concerning the Packet Data Convergence Protocol (PDCP). This PDCP is, for example, one of sublayers of the layer 2 in W-CDMA, and is a protocol including, as optional functions, a packet compression and decompression function, a cell re-selection function with no packet loss, and the like. PDCP is used, for example, in data communication between a base station device and a mobile station device, for the purposes of controlling the sequence of the communication and of keeping the communication data confidential.

In the specification "3GPP TS25.323, V3.3.0 (2000-09)" (Non-patent Document 1), for the purpose of controlling the sequence of data communication between a base station device and a mobile station device, PDCP is defined to perform window control by buffering 2048 pieces of data.

FIG. 16 is a schematic diagram for explaining general data processing using PDCP. As shown in FIG. 16, a core network device (backhaul) 600 sends data to a mobile station device (user terminal) 400 via a wireless base station device 500.

The wireless base station device 500 comprises a PDCP buffer unit 510 which is a buffer corresponding with PDCP. The wireless base station device 500 stores data sent from the core network device 600 temporarily into the PDCP buffer unit 510, and sends the data stored in the PDCP buffer unit 510 to the mobile station device 400. Here, as its specification is defined in the standard described in Non-patent Document 1, the PDCP buffer unit 510 is determined to have 2048 windows and not to be required to guarantee the volume of data exceeding the capacity of the windows.

In Japanese Patent Application Laid-Open No. 2009-89270 (Patent Document 1), described is a reference technology which is a communication system of an LTE (Long Term Evolution) method where a switching device sends data to a mobile station device via a wireless base station device.

Patent Document 1: Japanese Patent Application Laid-Open No. 2009-89270

Non-patent document 1: 3GPP TS25.323, V3.3.0 (2000-09)

DISCLOSURE OF INVENTION

Technical Problem

However, there is a limit on the data storage capacity of the PDCP buffer unit 510. Accordingly, there may be a case, for example, the volume of data inputted to the PDCP buffer unit 510 becomes larger than that outputted from the PDCP buffer unit 510. Also, data resending may be made from the core network device 600 to the mobile station device 400 via the wireless base station device 500, as a result of occurrence of communication quality degradation in the section where wireless communication is performed. In those cases, there arises a problem in that data piles up at the wireless base station device 500 and data unable to be accommodated into the windows of the PDCP buffer unit 510 is lost. It results in a state where it is difficult for the wireless base station device 500 to continue the window control of 2048 pieces of data using the PDCP buffer unit 510. It can be assumed to provide a further buffer unit for storing data inputted from the core network device 600, in addition to the PDCP buffer unit 510. However, because there is a limit also on the data storage capacity of the additional buffer unit, there arises the same problem as that described above.

The present invention has been made in view of such circumstances and provides a technology which can reduce loss of data communicated between communication devices.

Solution to Problem

A communication system of the present invention is a communication system including a second communication device which sends data to a first communication device, and also including a third communication device which sends data to the second communication device, the communication system comprising: a buffer unit which is provided in the second communication device and temporarily stores data sent from the third communication device for the purpose of sending the data to the first communication device; a data measurement unit which is provided in the second communication device and measures the volume of data stored in the buffer unit; a sending data storage unit which is provided in the third communication device and stores data to be sent to the second communication device; a transmission unit which is provided in the third communication device and sends the data stored in the sending data storage unit to the second communication device; and a congestion state determination unit which is provided in the second or the third communication devices and determines whether or not the buffer unit is in a congestion state, on the basis of a measurement value of the data volume measured by the data measurement unit; wherein, on the basis of a result of the determination by the congestion state determination unit, the transmission unit sends data stored in the sending data storage unit to the second communication device.

A wireless base station device of the present invention comprises a buffer unit which temporarily stores inputted data and a data measurement unit which measures the volume of data stored in the buffer unit, and the wireless base station device receives data sent from the above-mentioned core network device in accordance with a result of determination of whether or not the buffer unit is in a congestion state, which is made on the basis of a measurement value of the data volume measured by the data measurement unit, and stores the received data into the buffer unit.

Advantageous Effects of Invention

By the use of the technology according to the present invention, loss of data communicated between communication devices can be reduced.

BRIEF DESCRIPTION OF THE DRAWINGS

FIG. 1 is a diagram showing a configuration of a communication system according to a first exemplary embodiment of the present invention.

FIG. 2 is a table showing an example of set contents of a congestion determination threshold value and a congestion release threshold value.

FIG. 3 is a diagram showing a flow of operation of the communication system according to the first exemplary embodiment of the present invention.

Figure 4:
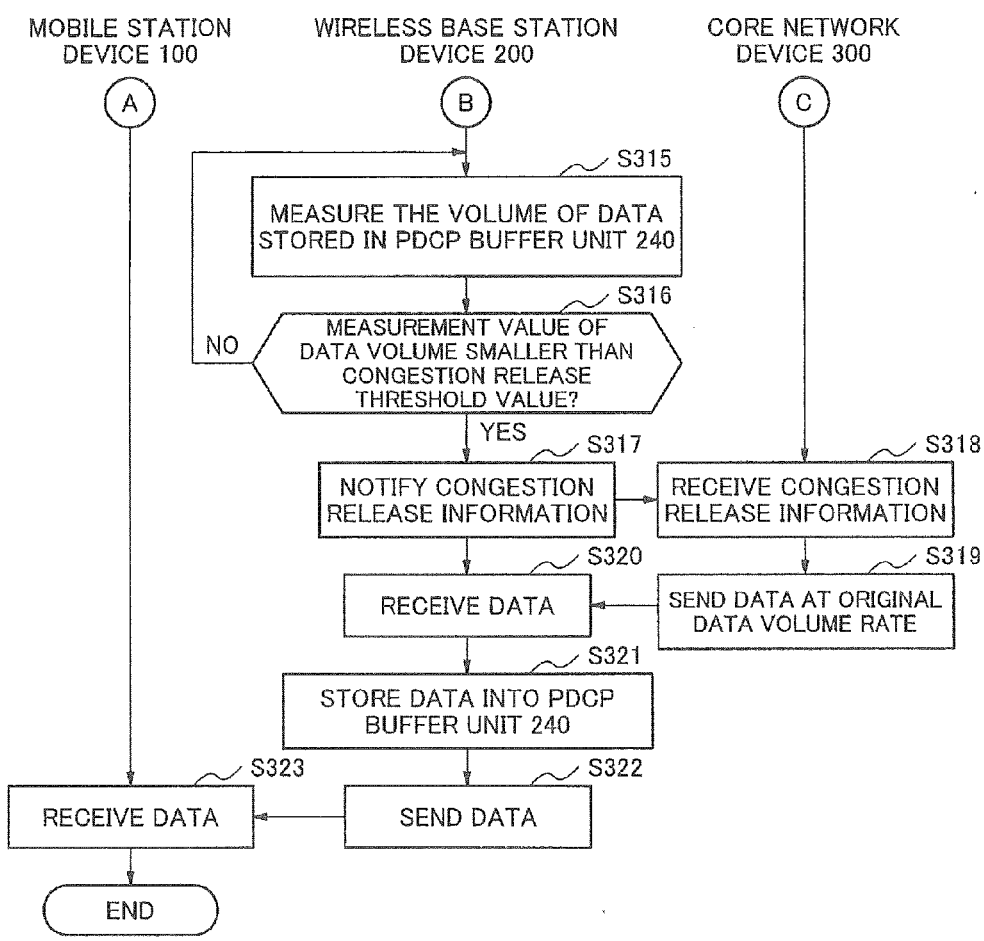
FIG. 4 is a diagram showing a continuation of the flow of operation of the communication system according to the first exemplary embodiment of the present invention.

REFERENCE SIGNS LIST 100 mobile station device
110 antenna unit
120 transmission/reception unit
130 control unit
200, 200A, 200B wireless base station device
210 antenna unit
220 transmission/reception unit
221 congestion state notification unit
222 congestion release notification unit
230 control unit
231 data measurement unit
232 congestion state determination unit
233 congestion determination threshold value setting unit
234 congestion release determination unit
235 congestion release threshold value setting unit
240 PDCP buffer unit
300, 300A, 300B, 300C core network device
310 antenna unit
320 transmission/reception unit
330, 330A, 330B, 330C control unit
332 congestion state determination unit
333 congestion determination threshold value setting unit
334 congestion release determination unit
335 congestion release threshold value setting unit
340 sending data storage unit
350 congestion release timer unit
900 network

DESCRIPTION OF EMBODIMENTS

<First Exemplary Embodiment>

FIG. 1 shows a configuration of a communication system according to a first exemplary embodiment of the present invention.

As shown in FIG. 1, the communication system 1000 according to the first exemplary embodiment of the present invention is configured to comprise a mobile station device 100, a wireless base station device 200 and a core network device 300. Here, the communication system 1000 is assumed to be a system corresponding with the standards of 3GPP (in particular, with PDCP specified in the specification 3GPP TS36.323). However, as long as each constituent unit of the communication system 1000 functions as described below, the communication system 1000 is not limited to the one corresponding with the standards of 3GPP.

The mobile station device 100 performs data communication by wireless with the wireless base station device 200. The wireless base station device 200 performs data communication by wireless with the mobile station device 100 within the communication area of the wireless base station device 200. The wireless base station device 200 performs data communication by wireless also with the core network device 300. The core network device 300 performs data communication by wireless with the wireless base station device 200. The mobile station device 100 may be referred to as a user terminal, and the core network device 300 as a backhaul. The mobile station device 100, the wireless base station device 200 and the core network device 300 correspond to first, second and third communication devices of the present invention, respectively. The wireless base station device 200 also corresponds to a base station device of the present invention.

Hereinafter, configurations of the mobile station device 100, the wireless base station device 200 and the core network device 300 will be described in detail.

The mobile station device 100 is configured to comprise an antenna unit 110, a transmission/reception unit 120 and a control unit 130.

The antenna unit 110 is provided for the purpose of data communication by wireless with the wireless base station device 200.

Via the antenna unit 110, the transmission/reception unit 120 performs data communication with the wireless base station device 200. The control unit 130 controls the whole of the mobile station device 100.

The wireless base station device 200 is configured to comprise an antenna unit 210, a transmission/reception unit 220, a control unit 230 and a PDCP buffer unit 240. The PDCP buffer unit 240 corresponds to a buffer unit of the present invention.

The antenna unit 210 is provided for the purpose of data communication by wireless with the mobile station device 100 and the core network device 300.

Via the antenna unit 210, the transmission/reception unit 220 performs data communication with the mobile station device 100 within the communication area. The transmission/reception unit 220 performs data communication also with the core network device 300. The transmission/reception unit 220 is configured to comprise a congestion state notification unit 221 and a congestion release notification unit 222.

When a congestion state determination unit 232, which will be described later, has determined that the PDCP buffer unit 240 is in a congestion state, the congestion state notification unit 221 notifies the core network device 300 of the PDCP buffer unit 240 being in the congestion state, as congestion state information, via the antenna unit 210. At that time, the wireless base station device 200 may notify the core network device 300 of the congestion state information by, for example, putting the information on a new message or a new parameter of the S1 Application protocol (S1-AP) or the GPRS Tunneling Protocol for User Plane (GTP-u). Here, S1-AP is referred to as, for example, a control protocol for performing communication between the wireless base station device 200 and the core network device 300 (refer to 3GPP specification: 36.413). GTP-u is referred to as a protocol for performing data transfer between the wireless base station device 200 and the core network device 300 in case of hand over (refer to 3GPP TS29.281, V8.2.0 (2009-06)).

When a congestion release determination unit 234, which will be described later, has determined that the PDCP buffer unit 240 is released from the congestion state, the congestion release notification unit 222 notifies the core network device 300 of the PDCP buffer unit 240 being released from the congestion state, as congestion release information, via the antenna unit 210. At that time, similarly to when notifying congestion state information, the wireless base station device 200 notifies the core network device 300 of the congestion release information by, for example, putting the information on a new message or a new parameter of S1-AP or GTP-u.

The control unit 230 controls the whole of the wireless base station device 200. The control unit 230 is configured to comprise a data measurement unit 231, a congestion state determination unit 232, a congestion determination threshold value setting unit 233, a congestion release determination unit 234 and a congestion release threshold value setting unit 235.

The data measurement unit 231 measures the volume of data stored in the PDCP buffer unit 240.

On the basis of a measurement value of the data volume measured by the data measurement unit 231, the congestion state determination unit 232 determines whether or not the PDCP buffer unit 240 is in a congestion state. Specifically, by comparing the measurement value of the data volume measured by the data measurement unit 231 and a congestion determination threshold value set by the congestion determination threshold value setting unit 233, which will be described later, the congestion state determination unit 232 determines whether or not the PDCP buffer unit 240 is in a congestion state.

The congestion determination threshold value setting unit 233 sets a congestion determination threshold value which is a threshold value for determining whether or not the PDCP buffer unit 240 is in a congestion state.

After the PDCP buffer unit 240 is determined to be in a congestion state by the congestion state determination unit 232, the congestion release determination unit 234 determines whether or not the PDCP buffer unit 240 is released from the congestion state. Specifically, by comparing a measurement value of the data volume measured by the data measurement unit 231 and a congestion release threshold value set by the congestion release threshold value setting unit 235, which will be described later, the congestion release determination unit 234 determines whether or not the PDCP buffer unit 240 is released from the congestion state.

The congestion release threshold value setting unit 235 sets a congestion release threshold value which is a threshold value for determining whether or not the PDCP buffer unit 240 is released from a congestion state.

The PDCP buffer unit 240 temporarily stores data sent from the core network device 300, in order for the wireless base station device 200 to send the data to the mobile station device 100.

Here, a description will be given of set contents of the above-mentioned congestion determination threshold value and congestion release threshold value. FIG. 2 is a table showing an example of set contents of the congestion determination threshold value and congestion release threshold value. As shown in FIG. 2, both of the congestion determination threshold value and congestion release threshold value may be set using, for example, the amount of usage of the PDCP buffer unit 240 (in size or number) or its usage rate (in %). Here, parameters used in the setting of the congestion determination threshold value and congestion release threshold value may be set with respect to each device, each cell, each mobile station device 100, each bearer or each QoS (Quality of Service). The congestion determination threshold value and congestion release threshold value may be different values from each other and may be the same value.

The core network device 300 is configured to comprise an antenna unit 310, a transmission/reception unit 320, a control unit 330 and a sending data storage unit 340. The core network device 300 is connected to a network 900 such as the internet and acquires data inputted from the network 900. The transmission/reception unit 320 corresponds to a transmission unit of the present invention.

The antenna unit 310 is provided for the purpose of performing data communication by wireless with the wireless base station device 200. Via the antenna unit 310, the transmission/reception unit 320 performs data communication with the wireless base station device 200. The control unit 330 controls the whole of the core network device 300. The sending data storage unit 340 stores data to be sent to the wireless base station device 200. The data stored in the sending data storage unit 340 includes data inputted from the network 900 and data sent from the mobile station device 100 via the wireless base station device 200.

Next, a description will be given of operation of the communication system 1000 in the first exemplary embodiment of the present invention.

FIGS. 3 and 4 are diagrams showing a flow of operation of the communication system 1000 according to the first exemplary embodiment of the present invention.

As shown in FIG. 3, the core network device 300 sends data stored in the sending data storage unit 340 to the wireless base station device 200 (step 301; hereafter, each step will be referred to such as S301, abbreviating "step" to S). Receiving the data sent from the core network device 300 (S302), the wireless base station device 200 stores the received data temporarily into the PDCP buffer unit 240

(S303). The wireless base station device 200 sends the data stored in the PDCP buffer unit 240 sequentially to the mobile station device 100 (S304). The mobile station device 100 receives the data sent by the wireless base station device 200 (S305).

Next, in the wireless base station device 200, the data measurement unit 231 measures the volume of data stored in the PDCP buffer unit 240 (S306). The congestion state determination unit 232 determines whether or not a measurement value of the data volume measured by the data measurement unit 231 is larger than a congestion determination threshold value set in advance by the congestion determination threshold value setting unit 233 (S307). If the measurement value of the data volume is larger than the congestion determination threshold value (Yes at S307), the congestion state determination unit 232 determines that the PDCP buffer unit 240 is in a congestion state. At that time, the congestion state notification unit 221 notifies the core network device 300 of the PDCP buffer unit 240 being in the congestion state, as congestion state information (S308). On the other hand, if the measurement value of the data volume is smaller than the congestion determination threshold value (No at S307), the congestion state determination unit 232 determines that the PDCP buffer unit 240 is not in a congestion state. In that case, the wireless base station device 200 repeats the processes of S306 and S307.

Next, in the core network device 300, the transmission/reception unit 320 receives the congestion state information via the antenna unit 310 (S309). According to the congestion state information, in its sending data stored in the sending data storage unit 340 to the wireless base station device 200, the transmission/reception unit 320 reduces the volume rate of sending data under control by the control unit 330 (S310). Here, in S310, the transmission/reception unit 320 may temporarily suspend the sending of data stored in the sending data storage unit 340 to the wireless base station device 200. Then, the wireless base station device 200 receives data from the core network device 300 at a lower data volume rate than that in the normal state (S311). As a result of the reduction in the volume rate of data sent from the core network device 300 to the wireless base station device 200, the congestion state of the PDCP buffer unit 240 in the wireless base station device 200 is relaxed.

Next, the wireless base station device 200 stores data received in the new way temporarily in the PDCP buffer unit 240 (S312). The wireless base station device 200 sends the data stored in the PDCP buffer unit 240 sequentially to the mobile station device 100 (S313). Then, the mobile station device 100 receives the data sent by the wireless base station device 200 (S314).

Next, in the wireless base station device 200, the data measurement unit 231 measures again the volume of data stored in the PDCP buffer unit 240 (S315). The congestion release determination unit 234 determines whether or not a measurement value of the data volume measured by the data measurement unit 231 is smaller than a congestion release threshold value set in advance by the congestion release threshold value setting unit 235 (S316). If the measurement value of the data volume is smaller than the congestion release threshold value (Yes at S316), the congestion release determination unit 234 determines that the PDCP buffer unit 240 has been released from the congestion state. At that time, the congestion release notification unit 222 notifies the core network device 300 of the release of the congestion state of the PDCP buffer unit 240, as congestion release information (S317). On the other hand, if the measurement value of the data volume is larger than the congestion release threshold value (No at S316), the congestion release determination unit 234 determines that the PDCP buffer unit 240 has not been released from the congestion state. In that case, the wireless base station device 200 repeats the processes of S316 and S317.

Next, in the core network device 300, the transmission/reception unit 320 receives the congestion release information via the antenna unit 310 (S318). According to the congestion release information, in its sending data stored in the sending data storage unit 340 to the wireless base station device 200, the transmission/reception unit 320 returns the volume rate of sending data to that in the normal state under control by the control unit 330 (S319). Then, the wireless base station device 200 receives data from the core network device 300 at the normal data volume rate (S320). Here, the normal data volume rate is assumed to mean a volume rate of sending data before its reduction in the step S310.

Next, in the wireless base station device 200, received data is stored temporarily in the PDCP buffer unit 240 (S321). Accordingly, in the state the PDCP buffer unit 240 is released from the congestion state, the wireless base station device 200 can receive data from the core network device 300 at the normal data volume rate. As a result, it can use the capacity of the PDCP buffer unit 240 efficiently. The wireless base station device 200 sends the data stored in the PDCP buffer unit 240 sequentially to the mobile station device 100 (S322). Then, the mobile station device 100 receives the data sent by the wireless base station device 200 (S323).

After that, until the core network device 300 comes to have no data to send, for example, processes shown in FIGS. 3 and 4 are repeated with respect to each data frame or each packet data.

Figure 5:
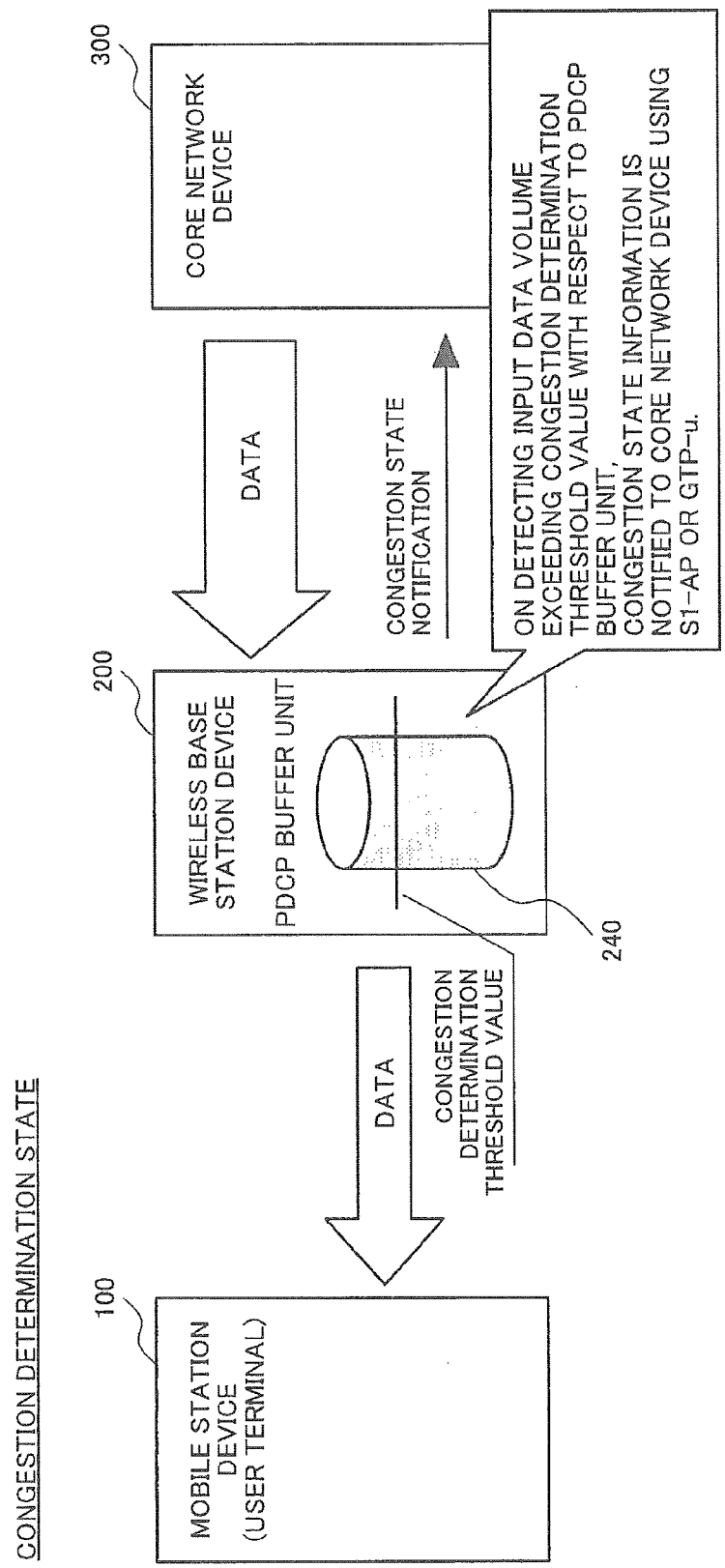
FIG. 5 is a diagram schematically showing a state of data communication in the communication system according to the first exemplary embodiment of the present invention.
Figure 6:
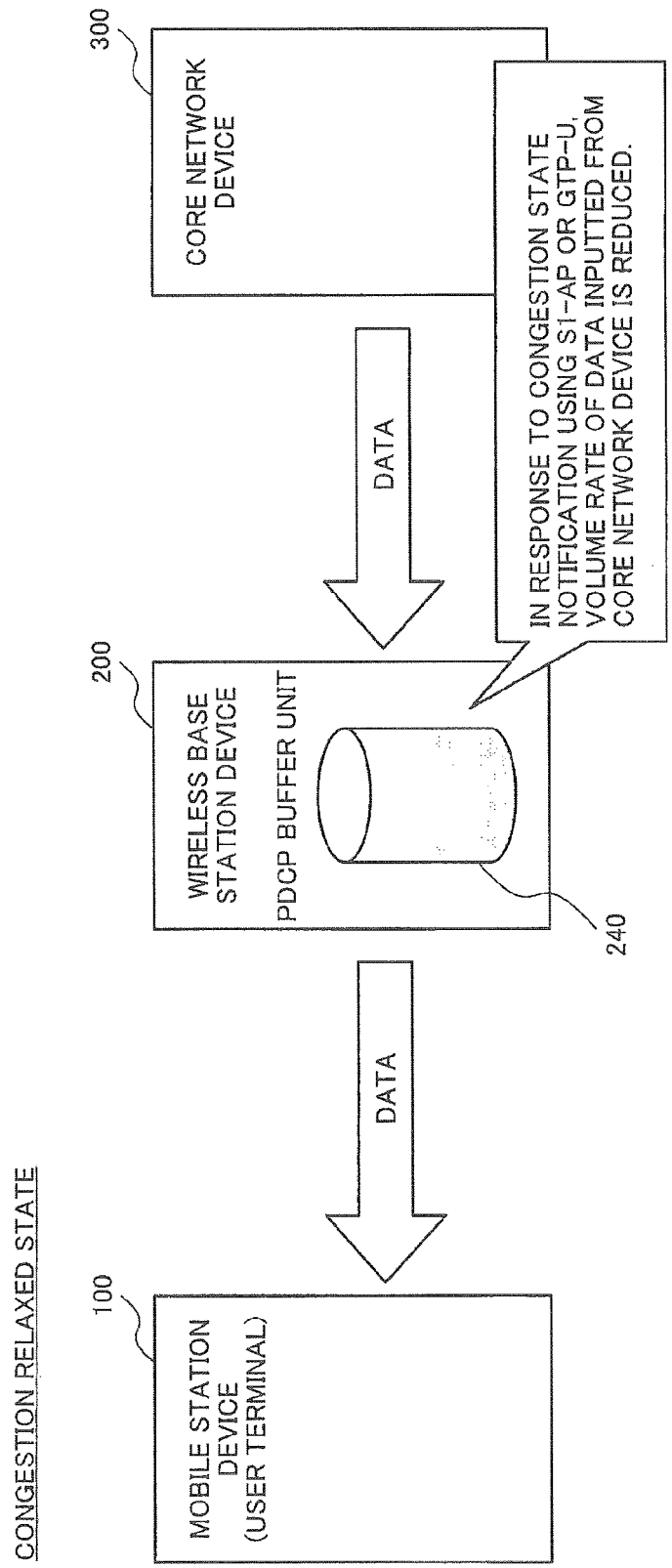
FIG. 6 is a diagram schematically showing another state of data communication in the communication system according to the first exemplary embodiment of the present invention.
Figure 7:
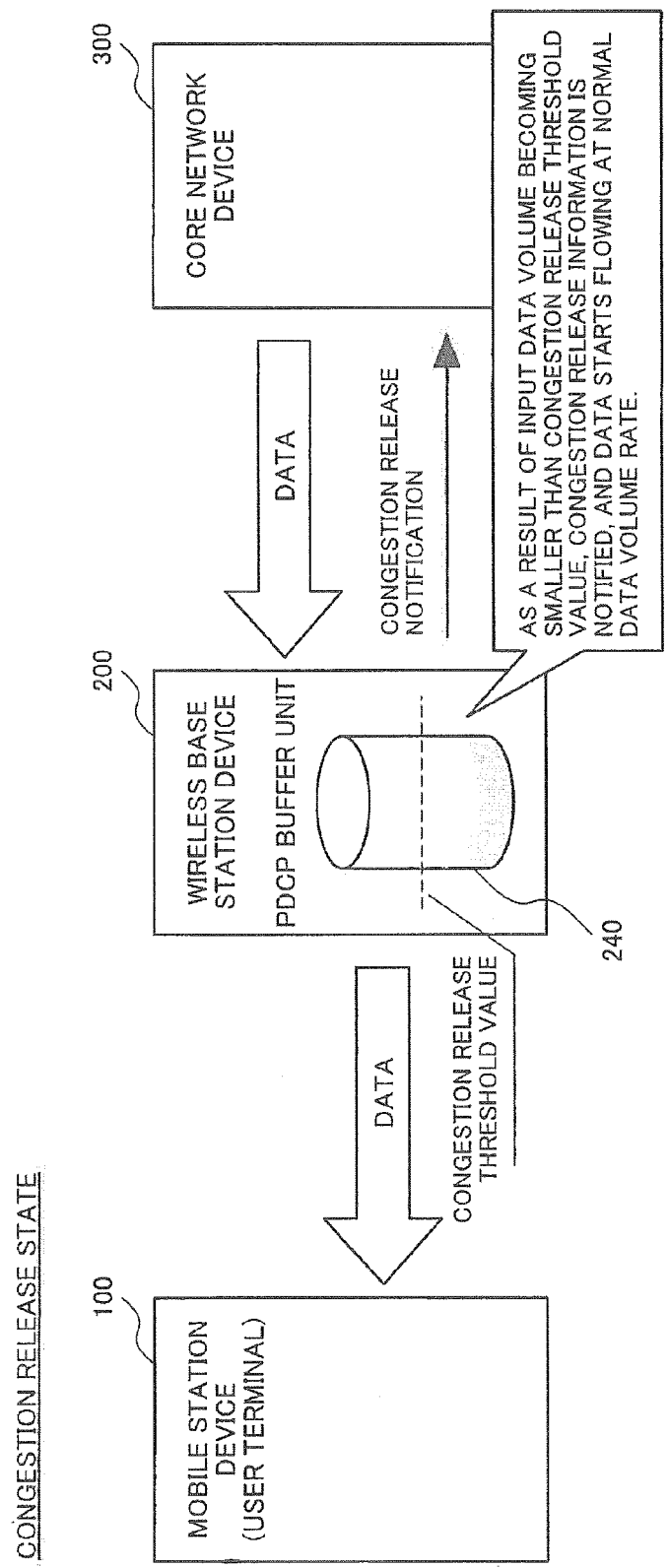
FIG. 7 is a diagram schematically showing still another state of data communication in the communication system according to the first exemplary embodiment of the present invention.

Next, data communication states of the communication system according to the first exemplary embodiment of the present invention will be described, separating them into a congestion-determined state, a congestion-relaxed state and a congestion-released state. FIGS. 5 to 7 are diagrams schematically showing data communication states of the communication system according to the first exemplary embodiment of the present invention. FIG. 5 shows the congestion-determined state, FIG. 6 the congestion-relaxed state, and FIG. 7 the congestion-released state. Here, the congestion-determined state corresponds to the processes of S301 to S309 in FIG. 3. The congestion-relaxed state corresponds to the processes of S310 to S314 in FIG. 3. The congestion-released state corresponds to the processes of S315 to S323 in FIG. 4.

As shown in FIG. 5, the congestion-determined state is assumed to be a state where the volume of data sent from the core network device 300 to the wireless base station device 200 is remarkably larger than that of data sent from the wireless base station device 200 to the mobile station device 100. Such a state may occur, for example, when resending from the core network device 300 to the mobile station device 100 via the wireless base station device 200 is performed as a result of occurrence of degradation in communication quality at the section where wireless communication is performed, or when the volume of traffic from the core network device 300 increases, or the like.

In such cases, in the wireless base station device 200, the volume of data stored in the PDCP buffer unit 240 may exceed the congestion determination threshold value. On detecting input data to the PDCP buffer unit 240 of a volume exceeding the congestion determination threshold value, the wireless base station device 200 notifies the core network device 300 of congestion state information using, for example, S1-AP or GTP-u. That is, in the wireless base station device 200, when a measurement value of the volume of data stored in the PDCP buffer unit 240 exceeds the congestion determination threshold value, the congestion state determination unit 232 determines that the PDCP buffer unit 240 is in a congestion state. Then, the congestion state notification unit 221 notifies the core network device 300 of the PDCP buffer unit 240 being in the congestion state, as congestion state information.

As shown in FIG. 6, the congestion-relaxed state is assumed to be a state where, according to the congestion state information, the core network device 300 has reduced the volume rate of data sent to the wireless base station device 200.

In that case, in the wireless base station device 200, as a result of the congestion state notification using S1-AP or GTP-u, the volume rate of data inputted from the core network device 300 decreases. As a result, the volume rate of data sent from the core network device 300 to the wireless base station device 200 becomes almost the same as that of data sent from the wireless base station device 200 to the mobile station device 100, and accordingly the congestion state of the PDCP buffer unit 240 is relaxed.

As shown in FIG. 7, the congestion-released state is assumed to be a state where the congestion state of the PDCP buffer unit 240 of the wireless base station device 200 is relaxed.

In that case, as a result of the volume of data inputted to the PDCP buffer unit 240 of the wireless base station device 200 being smaller than the congestion release threshold value, congestion release information is notified to the core network device 300, and data starts flowing at the normal volume rate (the volume rate of sending data before the notification of the congestion state information) again. That is, in the wireless base station device 200, when a measurement value of the volume of data stored in the PDCP buffer unit 240 becomes smaller than the congestion release threshold value, the congestion release determination unit 234 determines that the congestion state of the PDCP buffer unit 240 has been released. Then, the congestion release notification unit 222 notifies the core network device 300 of the PDCP buffer unit 240 being released from the congestion sate, as congestion release information. In the core network device 300, in accordance with the congestion release information, the transmission/reception unit 320 sends data stored in the above-mentioned sending data storage unit 340 to the wireless base station device 200 at the normal data volume rate.

As has been described above, the communication system 1000 in the first exemplary embodiment of the present invention is configured to comprise the mobile station device 100 (the first communication device), the wireless base station device 200 (the second communication device) and the core network device 300 (the third communication device).

The mobile station device 100 is arranged within the communication area of the wireless base station device 200. The wireless base station device 200 sends data to the mobile station device 100. The core network device 300 is connected to the network and sends data to the wireless base station device 200.

The wireless base station device 200 is configured to comprise the PDCP buffer unit 240, the data measurement unit 231 and the congestion state determination unit 232. Here, as will be described in another exemplary embodiment to be described later, the congestion state determination unit may be provided in the core network device 300. The PDCP buffer unit 240 temporarily stores data sent from the core network device 300 for the purpose of sending the data to the mobile station device 100. The data measurement unit 231 measures the volume of data stored in the PDCP buffer unit 240. On the basis of a measurement value of the data volume measured by the data measurement unit 231, the congestion state determination unit 232 determines whether or not the PDCP buffer unit 240 is in a congestion state.

The core network device 300 is configured to comprise the sending data storage unit 340 and the transmission/reception unit 320. The sending data storage unit 340 stores data to be sent to the wireless base station device 200. The transmission/reception unit 320 sends the data stored in the sending data storage unit 340 to the wireless base station device 200. At that time, the transmission/reception unit 320 performs the sending of the data stored in the sending data storage unit 340 to the wireless base station device 200 on the basis of a result of the determination by the congestion state determination unit 232.

As described above, in the communication system 1000 in the first exemplary embodiment, the wireless base station device 200 determines whether or not the PDCP buffer unit 240 is in a congestion state on the basis of a measurement value of the volume of data stored in the PDCP buffer unit 240. In this way, the wireless base station device 200 can recognize whether or not the PDCP buffer unit 240 is congested. Then, on the basis of the result of the determination of whether or not the PDCP buffer unit 240 is congested, the core network device 300 sends the data stored in the sending data storage unit 340 to the wireless base station device 200. By this way, it becomes possible, for example, in accordance with the result of the determination of whether or not the PDCP buffer unit 240 is congested, to send data to the wireless base station device 200 at a reduced volume rate of sending data or to suspend sending of the data. In this way, by suppressing the congestion state of the PDCP buffer unit 240 of the wireless base station device 200, it becomes possible to prevent loss of data inputted from the core network device 300 to the wireless base station device 200. As a result, loss of data communicated between the communication devices in the communication system 1000 can be reduced. Further, as a result of the reduction of loss of data communicated between the communication devices in the communication system 1000, it becomes possible to minimize the influence on the services delivered by the communication system 1000, such as that billing of an excess charge to a user can be prevented.

In the communication system 1000 in the first exemplary embodiment of the present invention, the wireless base station device 200 is provided with the congestion state notification unit 221 in addition to the congestion state determination unit 232. When the PDCP buffer unit 240 is determined to be in a congestion state, the congestion state notification unit 221 notifies the core network device 300 of the PDCP buffer unit 240 being in the congestion state, as congestion state information. In the core network device 300, on the basis of the congestion state information notified by the congestion state notification unit 221, the transmission/reception unit 320 sends data stored in the sending data storage unit 340 to the core network device 300.

By this way, on the basis of the congestion state information, the core network device 300 can recognize that the PDCP buffer unit 240 of the wireless base station device 200 is in the congestion state. Then, when sending the data stored in the sending data storage unit 340, the core network device 300 can adjust the volume rate of sending data.

In the communication system 1000 in the first exemplary embodiment of the present invention, the congestion determination threshold value setting unit 233 is provided in the wireless base station device 200. The congestion determination threshold value setting unit 233 sets a congestion determination threshold value which is a threshold value for determining whether or not the PDCP buffer unit 240 is in a congestion state. The congestion state determination unit 232 determines whether or not the PDCP buffer unit 240 is in a congestion state, on the basis of a measurement value of the volume of data measured by the data measurement unit 231 and the congestion determination threshold value set by the congestion determination threshold value setting unit 233. For example, if the measurement value of the data volume by the data measurement unit 231 is larger than the congestion determination threshold value, the congestion state determination unit 232 determines that the PDCP buffer unit 240 is in a congestion state. In the opposite case, that is, if the measurement value of the data volume by the data measurement unit 231 is smaller than the congestion determination threshold value, the congestion state determination unit 232 determines that the PDCP buffer unit 240 is not in a congestion state. By this way, taking the congestion determination threshold value as a reference, the congestion state determination unit 232 can easily determine whether or not the PDCP buffer unit 240 is in a congestion state.

In the communication system 1000 in the first exemplary embodiment of the present invention, the congestion release determination unit 234 is provided in the wireless base station device 200. As will be described in another exemplary embodiment to be described later, the congestion release determination unit 234 may be provided in the core network device 300. After the congestion state determination unit 232 determines that the PDCP buffer unit 240 is in a congestion state, the congestion release determination unit 234 determines whether or not the congestion state of the PDCP buffer unit 240 is released. By this way, the wireless base station device 200 can recognize whether or not the PDCP buffer unit 240 has been released from the congestion state. In the core network device 300, the transmission/reception unit 320 sends data stored in the sending data storage unit 340 to the wireless base station device 200 on the basis of a result of the determination by the congestion release determination unit 234. In this way, in accordance with a result of the determination of whether or not the PDCP buffer unit 240 has been released from the congestion state, the core network device 300 can send data to the wireless base station device 200 at an increased data volume rate or can continue to suspend data sending. Thus, the volume rate of data sent from the core network device 300 to the wireless base station device 200 can be adjusted in accordance with the amount of free data space in the PDCP buffer unit 240, and accordingly the PDCP buffer unit 240 can be used more efficiently.

In the communication system 1000 in the first exemplary embodiment of the present invention, the wireless base station device 200 is provided with the congestion release notification unit 222 in addition to the congestion release determination unit 234. When the congestion release determination unit 234 has determined that the congestion state of the PDCP buffer unit 240 is released, the congestion release notification unit 222 notifies the core network device 300 of the PDCP buffer unit 240 being released form the congestion state, as congestion release information. In the core network device 300, on the basis of the congestion release information notified by the congestion release notification unit 222, the transmission/reception unit 320 sends data stored in the sending data storage unit 340 to the base station device 200. At that time, for example, the transmission/reception unit 320 of the core network device 300 sends the data stored in the sending data storage unit 340 to the wireless base station device 200 at the same data volume rate as that before receiving the congestion state information sent by the congestion state notification unit 221. In this way, the core network device 300 can recognize, through the congestion release information, that the PDCP buffer unit 240 of the wireless base station device 200 has been released from the congestion state, and accordingly can adjust the volume rate of sending data when sending the data stored in the sending data storage unit 340.

In the communication system 1000 in the first exemplary embodiment of the present invention, the congestion release threshold value setting unit 235 is provided in the wireless base station device 200. The congestion release threshold value setting unit 235 sets a congestion release threshold value which is a threshold value for determining whether or not the congestion state of the PDCP buffer unit 240 has been released. The congestion release determination unit 234 determines whether or not the PDCP buffer unit 240 has been released from the congestion state, on the basis of a measurement value of the data volume measured by the data measurement unit 231 and the congestion release threshold value set by the congestion release threshold value setting unit 235. For example, if the measurement value of the data volume by the data measurement unit 231 is smaller than the congestion release threshold value, the congestion release determination unit 234 determines that the congestion state of the PDCP buffer unit 240 has been released. In the opposite case, that is, if the measurement value of the data volume by the data measurement unit 231 is larger than the congestion determination threshold value, the congestion release determination unit 234 determines that the congestion state of the PDCP buffer unit 240 has not been released. In this way, taking the congestion release threshold value as a reference, the congestion release determination unit 234 can easily determine whether or not the PDCP buffer unit 240 has been released from the congestion state.

<Second Exemplary Embodiment>

Figure 8:
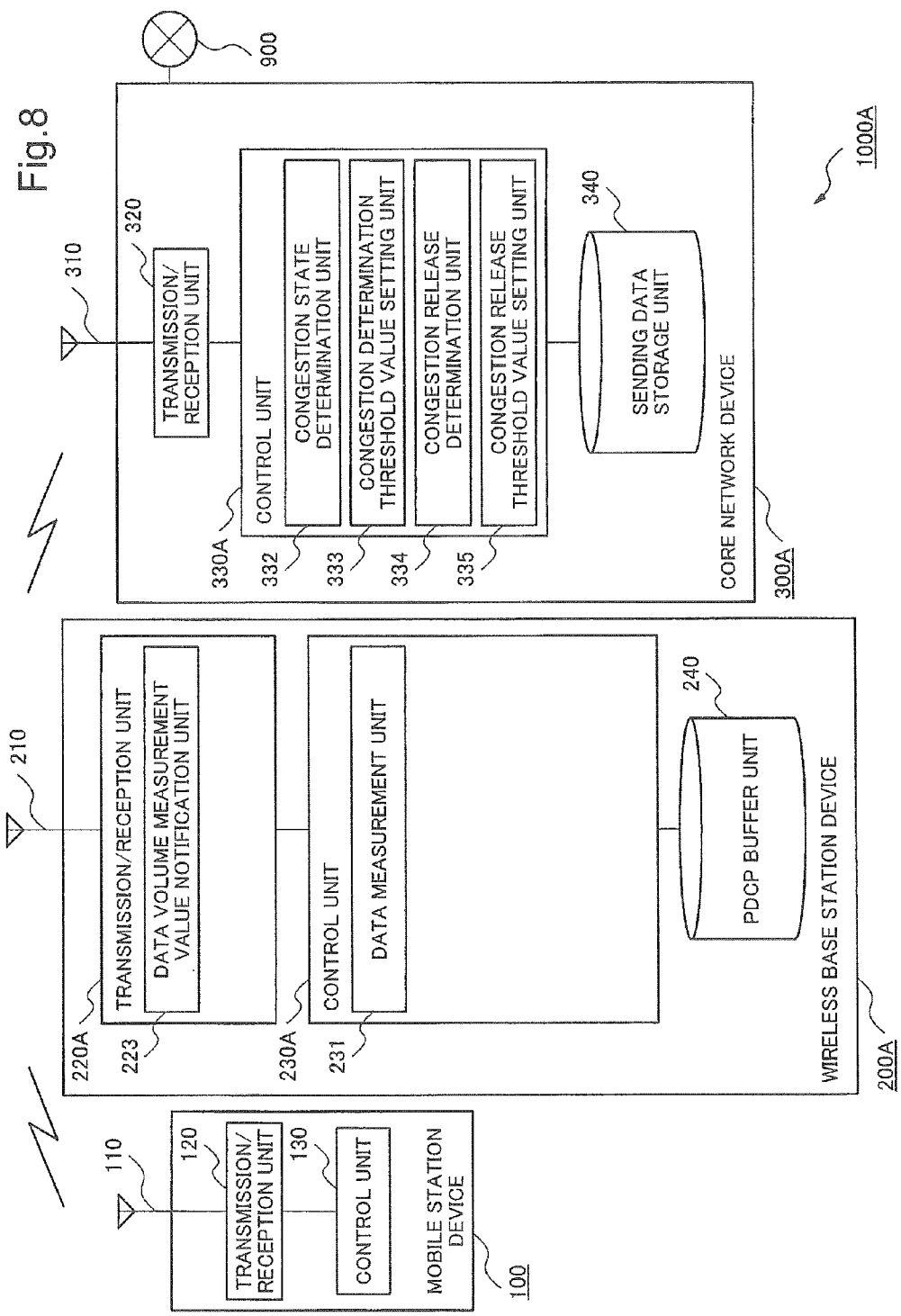
FIG. 8 is a diagram showing a configuration of a communication system according to a second exemplary embodiment of the present invention.

FIG. 8 shows a configuration of a communication system according to a second exemplary embodiment of the present invention.

As shown in FIG. 8, the communication system 1000A according to the second exemplary embodiment of the present invention is configured to comprise the mobile station device 100, a wireless base station device 200A and a core network device 300A.

Here, a comparison will be made between the communication system 1000 in the first exemplary embodiment and the communication system 1000A in the second exemplary embodiment. In the communication system 1000, the transmission/reception unit 220 of the wireless base station device 200 is provided with the congestion state notification unit 221 and the congestion release notification unit 222. In contrast, in the communication system 1000A, a transmission/reception unit 220A of the wireless base station device 200A is provided with only a data volume measurement value notification unit 223.

In the communication system 1000, the control unit 230 in the wireless base station device 200 is provided with the congestion state determination unit 232, the congestion determination threshold value setting unit 233, the congestion release determination unit 234 and the congestion release threshold value setting unit 235. In contrast, in the communication system 1000A, a congestion state determination unit 332, a congestion determination threshold value setting unit 333, a congestion release determination unit 334 and a congestion release threshold value setting unit 335 are provided in a control unit 330A in the core network device 300.

The data volume measurement value notification unit 223 notifies the core network device 300A of a measurement value of the data volume measured by the data measurement unit 231.

The congestion state determination unit 332, the congestion determination threshold value setting unit 333, the congestion release determination unit 334 and the congestion release threshold value setting unit 335 have basically the same functions as that of, respectively, the congestion state determination unit 232, the congestion determination threshold value setting unit 233, the congestion release determination unit 234 and the congestion release threshold value setting unit 235, which were described in the first exemplary embodiment.

However, it is different from the first exemplary embodiment that the congestion state determination unit 332 determines whether or not the PDCP buffer unit 240 is congested on the basis of the measurement value of the data volume notified by the data volume measurement value notification unit 223.

After the PDCP buffer unit 240 is determined to be in a congestion state by the congestion state determination unit 332, the congestion release determination unit 334 determines whether or not the PDCP buffer unit 240 is released from the congestion state. Specifically, by comparing a measurement value of the data volume notified by the data volume measurement value notification unit 223 and a congestion release threshold value set by the congestion release threshold value setting unit 335, the congestion release determination unit 334 determines whether or not the congestion state of the PDCP buffer unit 240 is released.

Next, a description will be given of operation of the communication system 1000A in the second exemplary embodiment of the present invention.

Figure 9:
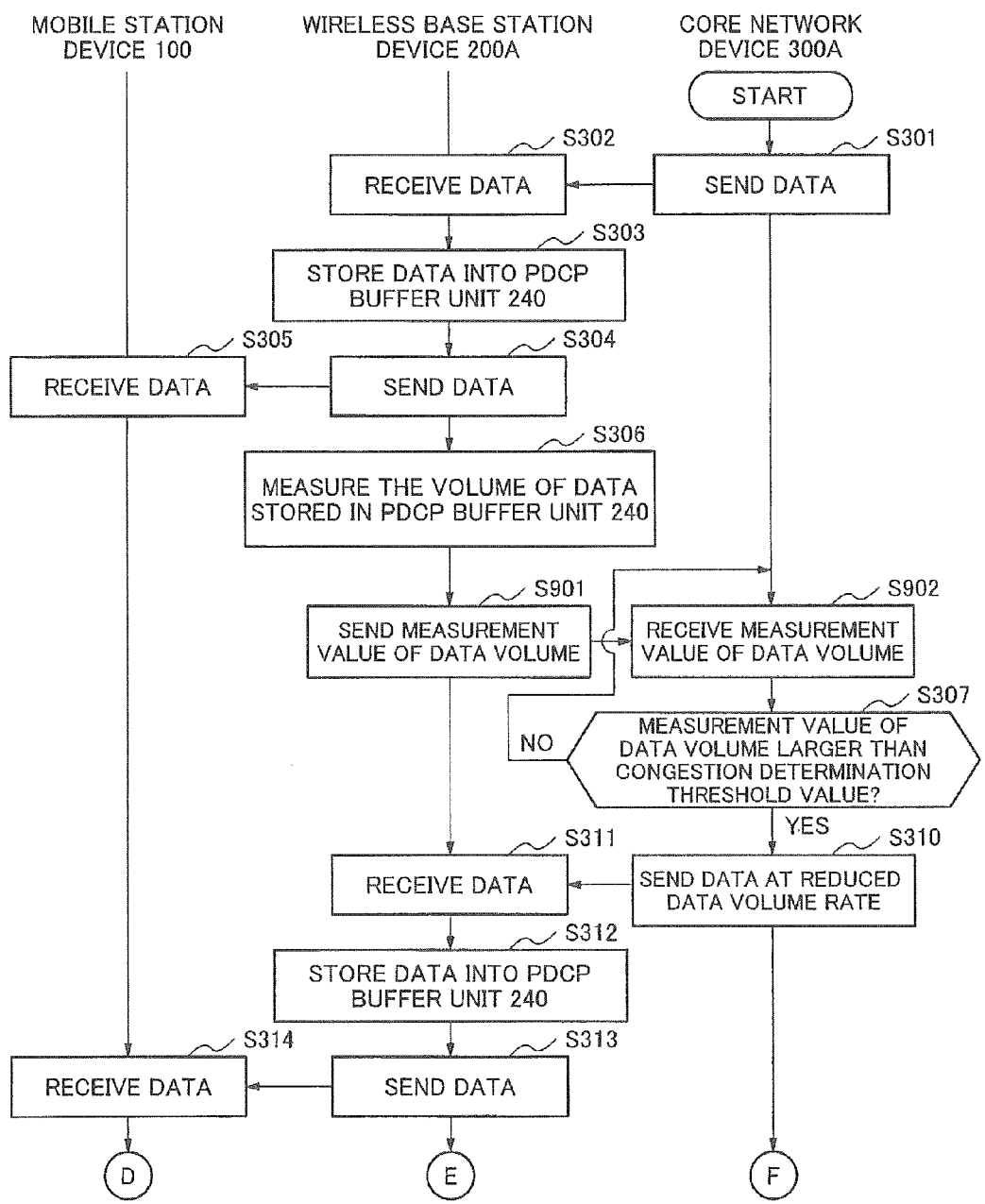
FIG. 9 is a diagram showing a flow of operation of the communication system according to the second exemplary embodiment of the present invention.
Figure 10:
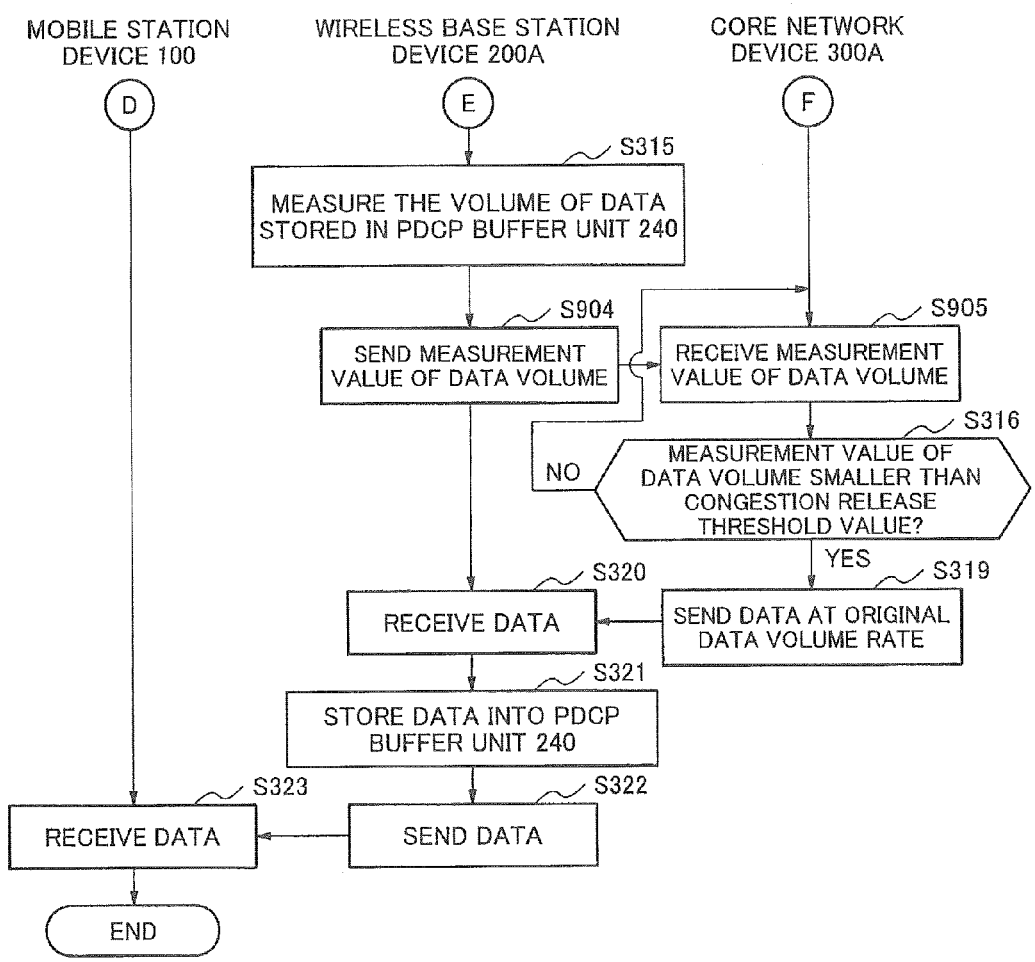
FIG. 10 is a continuation of the flow of operation of the communication system according to the second exemplary embodiment of the present invention.

FIGS. 9 and 10 are diagrams showing a flow of operation of the communication system 1000A according to the second exemplary embodiment of the present invention. In FIGS. 9 and 10, to the same processes as that shown in FIGS. 3 and 4, given are the respective same signs as that given in FIGS. 3 and 4. In the following description, for processes with the same contents as that described in relation to FIGS. 3 and 4, detailed explanation will be omitted.

As shown in FIG. 9, processes of the steps S301 to S306 are the same as that shown in FIG. 3.

Next, the data measurement value notification unit 223 notifies the core network device 300A of a measurement value of the data volume measured by the data measurement unit 231 via the antenna unit 210 (S901). In the core network device 300A, the transmission/reception unit 320 receives the measurement value of the data volume notified by the wireless base station device 200A (S902).

Next, the congestion state determination unit 332 determines whether or not the measurement value of the data volume notified of by the wireless base station device 200A is larger than a congestion determination threshold value set in advance by the congestion determination threshold value setting unit 333 (S307). If the measurement value of the data volume is larger than the congestion determination threshold value (Yes at S307), the congestion state determination unit 332 determines that the PDCP buffer unit 240 is in a congestion state. Accordingly, the transmission/reception unit 320 sends data stored in the sending data storage unit 340 to the wireless base station device 200A, reducing the volume rate of sending data under control by the control unit 330A (S310). Then, the wireless base station device 200A receives the data from the core network device 300A at a lower data volume rate than that in the normal state (S311). As a result, because the volume rate of data sent from the core network device 300A to the wireless base station device 200A is reduced, the congestion state of the PDCP buffer unit 240 in the wireless base station device 200A is relaxed. On the other hand, if the measurement value of the data volume is smaller than the congestion determination threshold value (No at S307), the wireless base station device 200A repeats the processes of S902 and S307.

Next, the wireless base station device 200A stores data received in the new way into the PDCP buffer unit 240 again (S312). The wireless base station device 200A sends the data stored in the PDCP buffer unit 240 sequentially to the mobile station device 100, using the transmission/reception unit 220A (S313). Then, the mobile station device 100 receives the data sent by the wireless base station device 200A (S314).

Next, in the wireless base station device 200A, the data measurement unit 231 measures again the volume of data stored in the PDCP buffer unit 240 (S315). Then, the data measurement value notification unit 223 notifies the core network device 300A of the measurement value of the data volume measured by the data measurement unit 231 via the antenna unit 210 (S904). In the core network device 300A, the transmission/reception unit 320 receives the measurement value of the data volume notified of by the wireless base station device 200A (S905).

Next, the congestion release determination unit 334 determines whether or not the measurement value of the data volume notified by the wireless base station device 200A is smaller than a congestion release threshold value set in advance by the congestion release threshold value setting unit 335 (S316). In this way, the core network device 300A can recognize whether or not the PDCP buffer unit 240 of the wireless base station device 200A has been released from the congestion state. If the measurement value of the data volume is smaller than the congestion release threshold value (Yes at S316), the congestion release determination unit 334 determines that the congestion state of the PDCP buffer unit 240 has been released. Then, the transmission/reception unit 320 sends the data stored in the sending data storage unit 340 to the wireless base station device 200A at the normal data volume rate, by returning the volume rate of sending data to that in the state before the step S310, under control by the control unit 330 (S319). Accordingly, the wireless base station device 200A receives data from the core network device 300A at the normal data volume rate (S320). In this way, the core network device 300A can adjust the volume rate of sending data when sending the data stored in the sending data storage unit 340. On the other hand, if the measurement value of the data volume is larger than the congestion release threshold value (No at S316), the congestion release determination unit 334 determines that the congestion state of the PDCP buffer unit 240 has not been released. Then, the wireless base station device 200A repeats the processes of S905 and S316.

Next, the wireless base station device 200A stores the received data into the PDCP buffer unit 240 (S321). In this way, in the state where the congestion state of the PDCP buffer unit 240 is released, because the wireless base station device 200A can receive data from the core network device 300 at the normal data volume rate, it can use the capacity of the PDCP buffer unit 240 efficiently. The wireless base station device 200A sends the data stored in the PDCP buffer unit 240 sequentially to the mobile station device 100 (S322). Then, the mobile station device 100 receives the data sent by the wireless base station device 200A (S323).

After that, until the core network device 300 comes to have no data to send, for example, processes shown in FIGS. 9 and 10 are repeated with respect to each data frame or each packet data.

As described above, in the communication system 1000A in the second exemplary embodiment of the present invention, the congestion state determination unit 332 is provided in the core network device 300A. Also with such a configuration, the same effect as that described in the first exemplary embodiment can be achieved.

In the communication system 1000A in the second exemplary embodiment of the present invention, also the congestion release determination unit 334 is provided in the core network device 300A. Also with such a configuration, the same effect as that described in the first exemplary embodiment can be achieved.

<Third Exemplary Embodiment>

Figure 11:
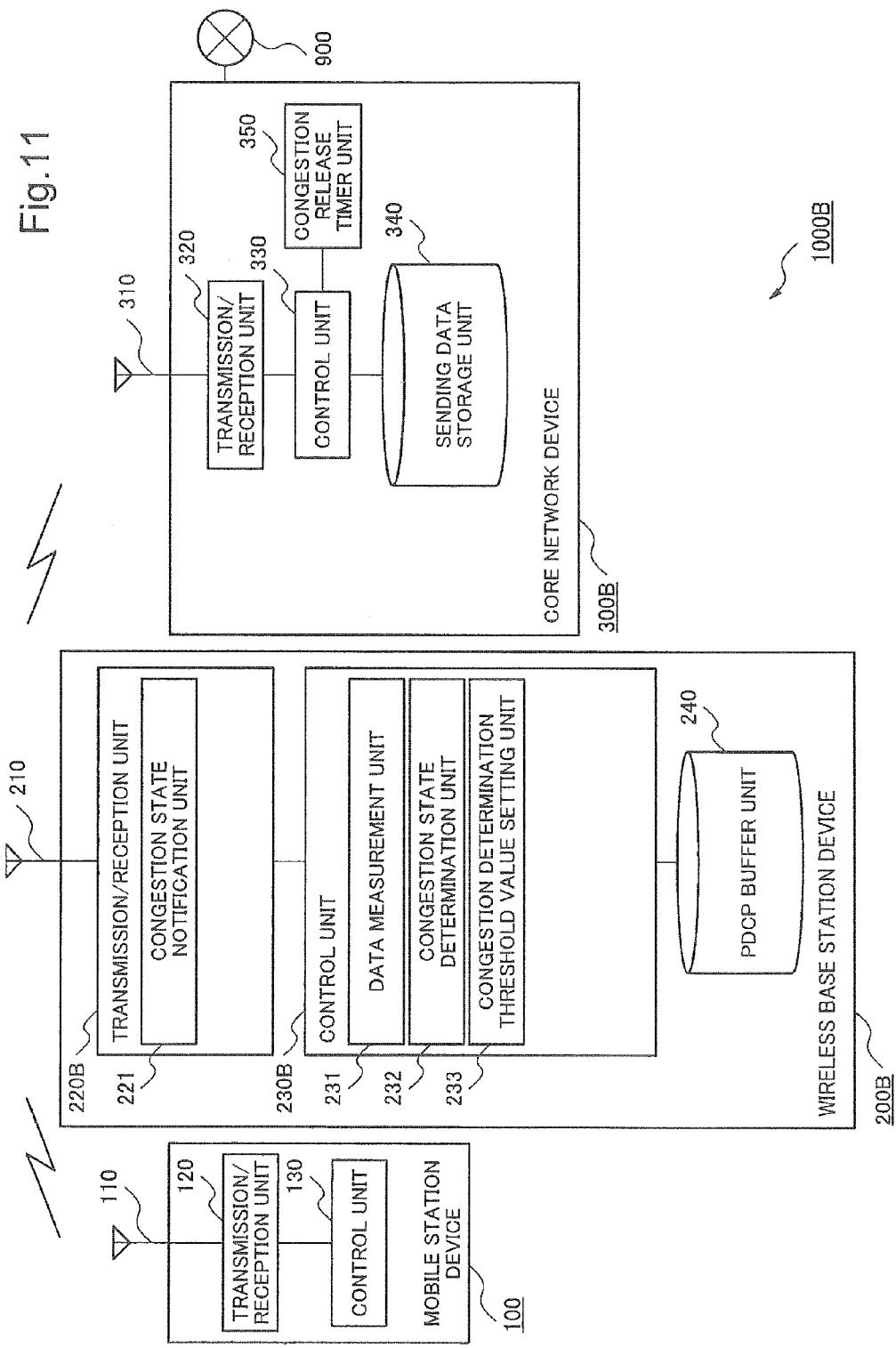
FIG. 11 is a diagram showing a configuration of a communication system according to a third exemplary embodiment of the present invention.

FIG. 11 shows a configuration of a communication system according to a third exemplary embodiment of the present invention.

As shown in FIG. 11, the communication system 1000B according to the third exemplary embodiment of the present invention is configured to comprise the mobile station device 100, a wireless base station device 200B and a core network device 300B.

Here, a comparison will be made between the communication system 1000 in the first exemplary embodiment and the communication system 1000B in the third exemplary embodiment.

In the communication system 1000, the wireless base station device 200 is provided with the congestion state notification unit 221 and the congestion release notification unit 222. In contrast, in the communication system 1000B, the wireless base station device 200B is provided with only the congestion state notification unit 221.

In the communication system 1000, the data measurement unit 231, the congestion state determination unit 232, the congestion determination threshold value setting unit 233, the congestion release determination unit 234 and the congestion release threshold value setting unit 235 are provided in the control unit 230 in the wireless base station device 200. In contrast, in the communication system 1000B, the data measurement unit 231, the congestion state determination unit 232 and the congestion determination threshold value setting unit 233 are provided in a control unit 230B in the wireless base station device 200B.

Further, the communication system 1000B is different from the communication system 1000 in that it is provided with a congestion release timer unit 350.

The congestion release timer unit 350 measures the elapsed time since a reception of congestion state information sent by the congestion state notification unit 221. Here, the congestion release timer unit 350 corresponds to a timer unit of the present invention.

Next, a description will be given of operation of the communication system 1000B in the third exemplary embodiment of the present invention.

Figure 12:
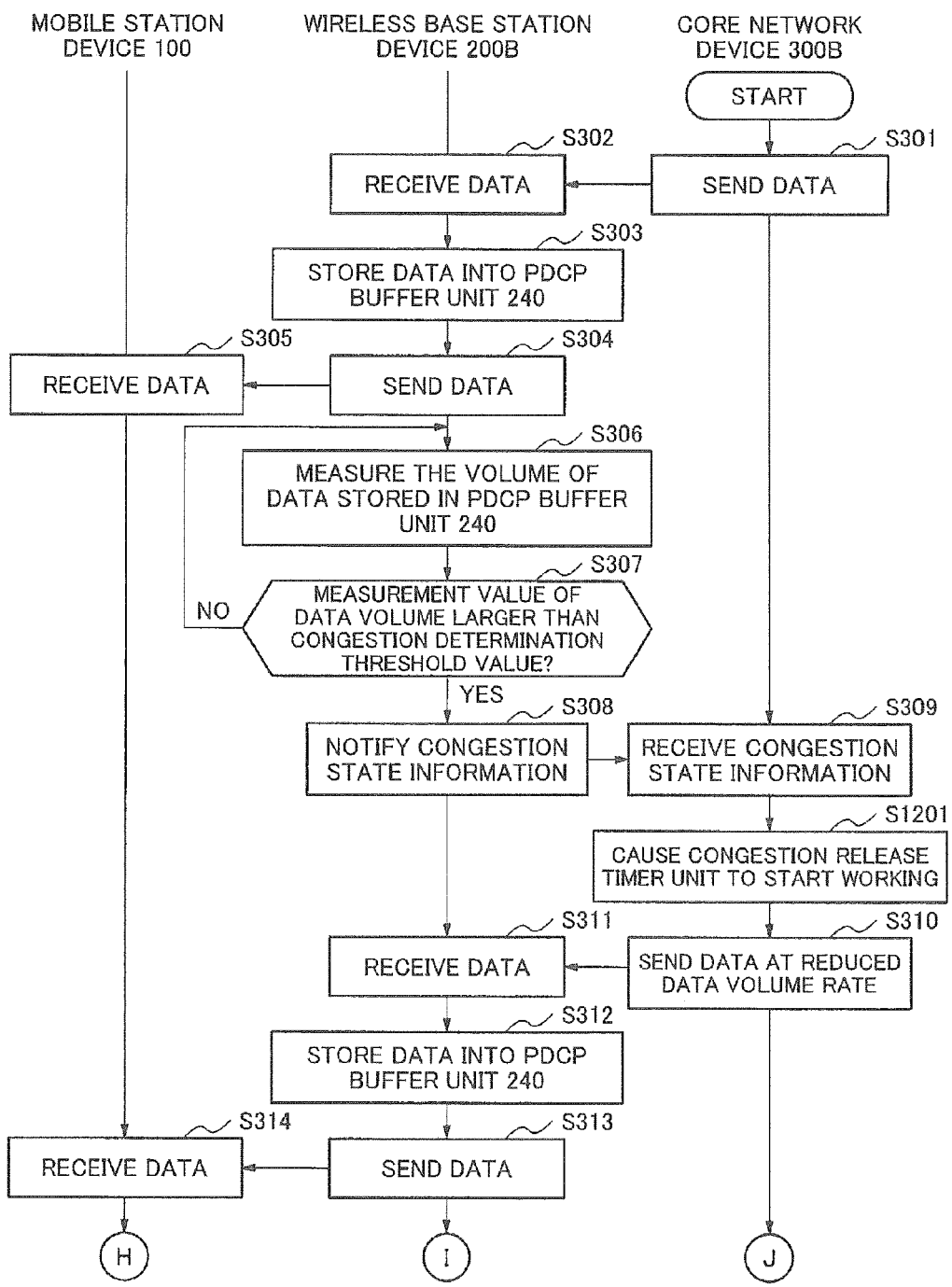
FIG. 12 is a diagram showing a flow of operation of the communication system according to the third exemplary embodiment of the present invention.
Figure 13:
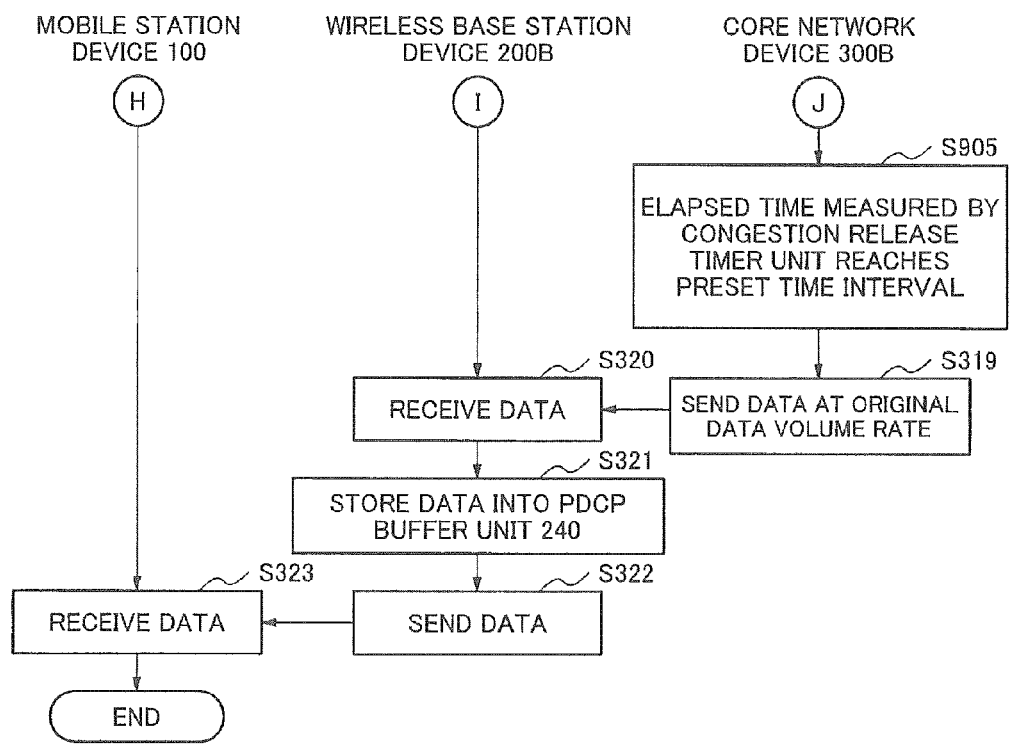
FIG. 13 is a continuation of the flow of operation of the communication system according to the third exemplary embodiment of the present invention.

FIGS. 12 and 13 are diagrams showing a flow of operation of the communication system 1000B according to the third exemplary embodiment of the present invention. In FIGS. 11 and 12, to the same processes as that shown in FIGS. 3 and 4, given are the respective same signs as that given in FIGS. 3 and 4. In the following description, for processes with the same contents as that described in relation to FIGS. 3 and 4, detailed explanation will be omitted.

As shown in FIG. 12, processes of the steps S301 to S309 are the same as that shown in FIG. 3.

In the core network device 300B, when the transmission/reception unit 320 has received congestion state information via the antenna unit 310 (S309), the congestion release timer unit 350 starts working to measure the elapsed time since the reception of the congestion state information sent by the congestion state notification unit 221 (S1201). Then, the transmission/reception unit 320 sends the data stored in the sending data storage unit 340 to the wireless base station device 200B, reducing the volume rate of sending data under control by the control unit 330 (S310). In the step S310, the transmission/reception unit 320 may suspend sending of the data stored in the sending data storage unit 340 to the wireless base station device 200B. Then, the wireless base station device 200 receives data from the core network device 300B at a lower data volume rate than that in the normal state (S311).

Next, the wireless base station device 200B stores the data received in the new way into the PDCP buffer unit 240 again (S312). The wireless base station device 200B sends the data stored in the PDCP buffer unit 240 sequentially to the mobile station device 100 (S313). Then, the mobile station device 100 receives the data sent by the wireless base station device 200B (S314).

Next, in the core network device 300B, when the elapsed time measured by the congestion release timer unit 350 reaches a time interval set in advance (S1202), the transmission/reception unit 320 returns the volume rate of sending data to that in the normal state and thereby sends data stored in the sending data storage unit 340 to the wireless base station device 200B (S319). Accordingly, the wireless base station device 200B receives data from the core network device 300B at the normal data volume rate (S320).

Next, the wireless base station device 200B stores the received data into the PDCP buffer unit 240 (S321). The wireless base station device 200B sends the data stored in the PDCP buffer unit 240 sequentially to the mobile station device 100 (S322). The mobile station device 100 receives the data sent by the wireless base station device 200B (S323).

After that, until the core network device 300 comes to have no data to send, for example, processes shown in FIGS. 12 and 13 are repeated with respect to each data frame or each packet data.

As described above, in the communication system 1000B in the third exemplary embodiment of the present invention, the core network device 300B further comprises the congestion release timer unit 350. The congestion release timer unit 350 measures the elapsed time since a reception of congestion state information sent by the congestion state notification unit 221 of the wireless base station device 200B. Then, when the elapsed time measured by the congestion release timer unit 350 reaches a time interval set in advance, the transmission/reception unit 320 sends data stored in the sending data storage unit 340 to the wireless base station device 200B, returning the volume rate of sending data to, for example, that in the state before the reception of the congestion state information sent by the congestion state notification unit 221. In this way, when the elapsed time measured by the congestion release timer unit 350 reaches a time interval set in advance, the core network device 300B regards the PDCP buffer unit 240 as having been released from the congestion state, and thereby can adjust the data volume rate when sending data stored in the sending data storage unit 340.

<Fourth Exemplary Embodiment>

Figure 14:
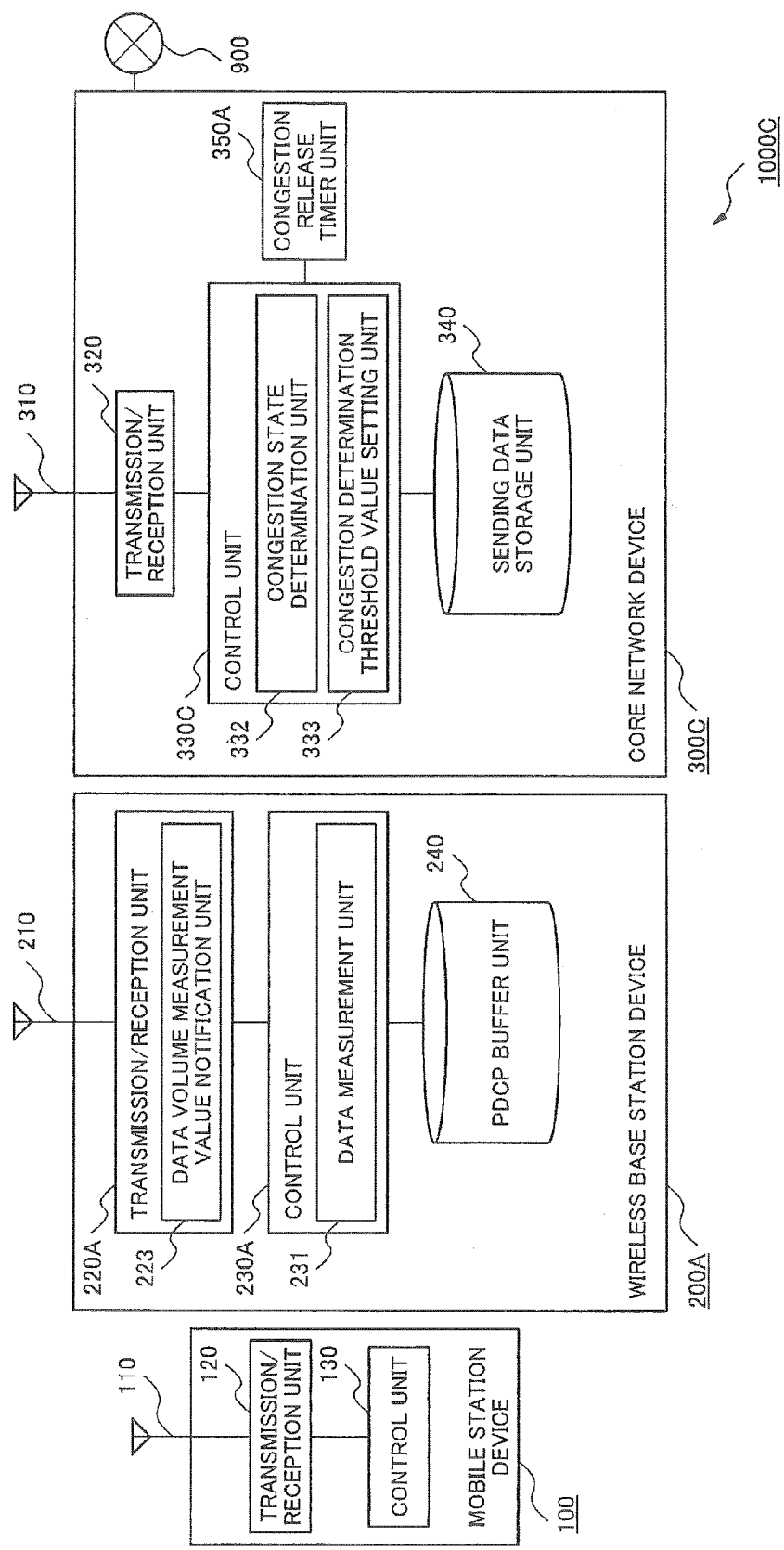
FIG. 14 is a diagram showing a configuration of a communication system according to a fourth exemplary embodiment of the present invention.

FIG. 14 shows a configuration of a communication system 1000C according to a fourth exemplary embodiment of the present invention.

As shown in FIG. 14, the communication system 1000C according to the fourth exemplary embodiment of the present invention is configured to comprise the mobile station device 100, the wireless base station device 200A and a core network device 300C.

Here, a comparison will be made between the communication system 1000A in the second exemplary embodiment and the communication system 1000C in the third exemplary embodiment.

In the communication system 1000A, the control unit 330A in the core network device 300A is provided with the congestion state determination unit 332, the congestion determination threshold value setting unit 333, the congestion release determination unit 334 and the congestion release threshold value setting unit 335. In contrast, in the communication system 1000C, a control unit 330C in the core network device 300C is provided with only the congestion state determination unit 332 and the congestion determination threshold value setting unit 333.

Further, the communication system 1000C is different from the communication system 1000A in that it is provided with a congestion release timer unit 350A.

The congestion release timer unit 350A measures the elapsed time since the congestion state determination unit 332 determining that the PDCP buffer unit 240 is in a congestion sate. The congestion release timer unit 350A corresponds to a timer unit of the present invention.

Next, a description will be given of operation of the communication system 1000C in the fourth exemplary embodiment of the present invention.

Figure 15:
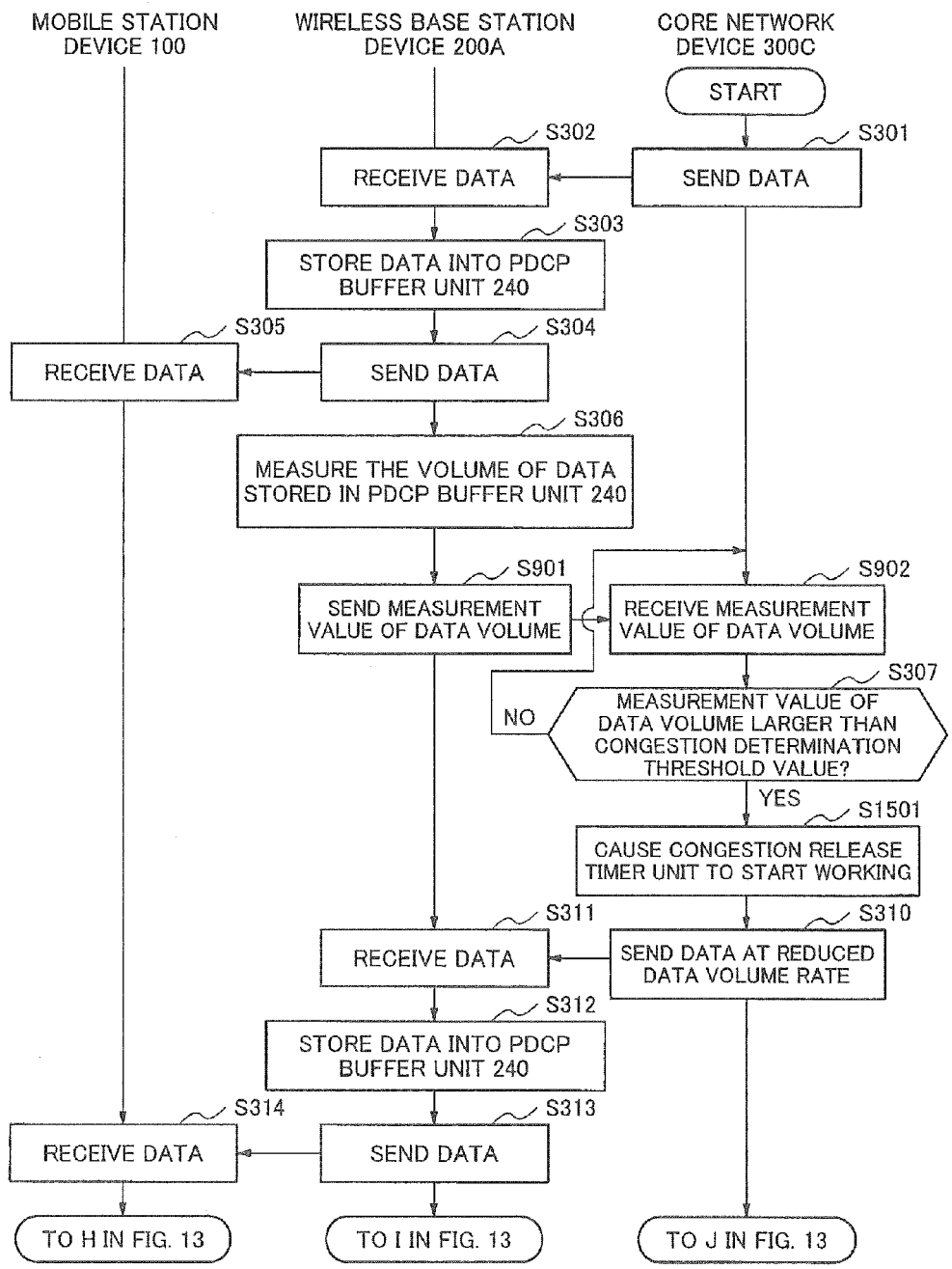
FIG. 15 is a diagram showing a flow of operation of the communication system according to the fourth exemplary embodiment of the present invention.
Figure 16:
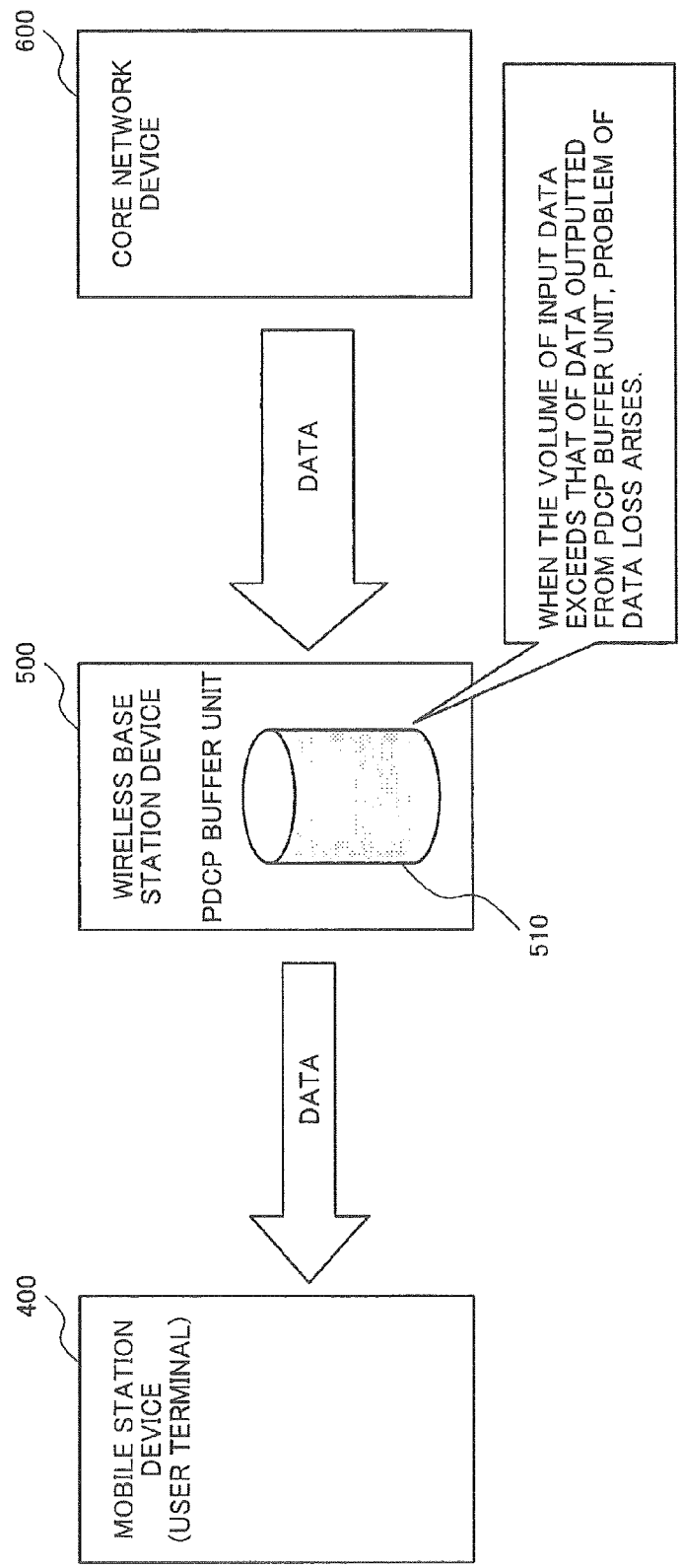
FIG. 16 is a schematic diagram for explaining general data processing using PDCP.

FIG. 15 is a diagram showing a flow of operation of the communication system 1000C according to the fourth exemplary embodiment of the present invention. In FIG. 15, to the same processes as that shown in FIGS. 9 and 10, given are the respective same signs as that given in FIGS. 9 and 10. In the following description, for processes with the same contents as that described in relation to FIGS. 9 and 10, detailed explanation will be omitted.

As shown in FIG. 15, processes of the steps S301 to S307 are the same as that shown in FIG. 9.

After execution of the step S307, the congestion release timer unit 350A starts working to measure the elapsed time since the congestion state determination unit 332 determining that the PDCP buffer unit 240 is in a congestion sate (S1501). Then, the transmission/reception unit 320 sends data stored in the sending data storage unit 340 to the wireless base station device 200A, reducing the volume rate of sending data under control by the control unit 330 (S310). In the step S310, the transmission/reception unit 320 may suspend sending of data stored in the sending data storage unit 340 to the wireless base station device 200B. Then, the wireless base station device 200 receives data from the core network device 300C at a lower data volume rate than that in the normal state (S311).

Next, the wireless base station device 200A stores the data received in the new way into the PDCP buffer unit 240 again (S312). The wireless base station device 200A sends the data stored in the PDCP buffer unit 240 sequentially to the mobile station device 100 (S313). Then, the mobile station device 100 receives the data sent by the wireless base station device 200B (S314).

Processes after the step S314 are the same as that shown in FIG. 13. That is, in the core network device 300C, when the elapsed time measured by the congestion release timer unit 350A reaches a time interval set in advance (S1202), the transmission/reception unit 320 returns the volume rate of sending data to that in the normal state and thereby sends data stored in the sending data storage unit 340 to the wireless base station device 200B (S319). Accordingly, the wireless base station device 200B receives data from the core network device 300B at the normal data volume rate (S320).

The wireless base station device 200A stores the received data into the PDCP buffer unit 240 (S321). The wireless base station device 200A sends the data stored in the PDCP buffer unit 240 sequentially to the mobile station device 100 (S322). The mobile station device 100 receives the data sent by the wireless base station device 200A (S323).

After that, until the core network device 300C comes to have no data to send, for example, the processes shown in FIGS. 15 and 13 are repeated with respect to each data frame or each packet data.

As described above, in the communication system 1000C in the fourth exemplary embodiment of the present invention, the core network device 300C further comprises the congestion release timer unit 350A. The congestion release timer unit 350A measures the elapsed time since the congestion state determination unit 332 determining that the PDCP buffer unit 240 is in a congestion state. Then, when the elapsed time measured by the congestion release timer unit 350A reaches a time interval set in advance, the transmission/reception unit 320 sends data stored in the sending data storage unit 340 to the wireless base station device 200A, returning the volume rate of sending data to, for example, that in the state before the congestion state determination unit 332 determining that the PDCP buffer unit 240 is in a congestion state. In this way, when the elapsed time measured by the congestion release timer unit 350A reaches a time interval set in advance, the core network device 300C regards the PDCP buffer unit 240 as having been released from the congestion state, and thereby can adjust the data volume rate when sending data stored in the sending data storage unit 340.

In the first to fourth exemplary embodiments, descriptions have been given assuming that the communication systems are with a data flow basically in the downlink direction. That is, in the first to fourth exemplary embodiments, the mobile station device 100 has been described to be a first communication device of the present invention, the wireless base station devices 200, 200A or 200B to be a second communication device, and the core network devices 300, 300A, 300B or 300C to be a third communication device. However, communication systems of the present invention are not limited to those ones, and they may be ones with a data flow basically in the uplink direction. That is, the core network devices 300, 300A, 300B or 300C may be defined as a first communication device of the present invention, the mobile station device 100 as a third communication device, and the wireless base station devices 200, 200A or 200B as a second communication device. Also in those cases, the same effect as that described above can be achieved.

Further, when the PDCP buffer unit 240 is determined to be in a congestion state at the wireless base station device 200, for dealing with the congestion state, it is possible not only to perform control between the wireless base station device 200 and the core network device 300 to suppress the congestion, but also to adjust the wireless band by cooperating with a wireless scheduler with respect to the mobile station device 100 and thereby place priority on stable provision of the services by the communication system 1000

Part or the whole of the first to fourth exemplary embodiments described above may also be described as follows, but is not limited to them.

(Supplementary Note 1)

A communication system including a second communication device which sends data to a first communication device, and also including a third communication device which sends data to said second communication device, the communication system comprising:

a buffer unit which is provided in said second communication device and temporarily stores data sent from said third communication device for the purpose of sending the data to said first communication device;

a data measurement unit which is provided in said second communication device and measures the volume of data stored in said buffer unit;

a sending data storage unit which is provided in said third communication device and stores data to be sent to said second communication device;

a transmission unit which is provided in said third communication device and sends data stored in said sending data storage unit to said second communication device; and a congestion state determination unit which is provided in said second or third communication devices and, on the basis of a measurement value of said data volume measured by said data measurement unit, determines whether or not said buffer unit is in a congestion state;

wherein, on the basis of a result of the determination by said congestion state determination unit, said transmission unit sends data stored in said sending data storage unit to said second communication device.

(Supplementary Note 2)

The communication system according to supplementary note 1, wherein:

said congestion state determination unit is provided in said second communication device;

said second communication device is provided with a congestion state notification unit which, when said congestion state determination unit has determined that said buffer unit is in a congestion state, notifies said third communication device of said buffer unit being in the congestion state, as congestion state information; and said transmission unit sends data stored in said sending data storage unit to said second communication device, on the basis of said congestion state information sent by said congestion state notification unit.

(Supplementary Note 3)

The communication system according to supplementary note 1, wherein said congestion state determination unit is provided in said third communication device.

(Supplementary Note 4)

The communication system according to any one of supplementary notes 1 to 3, comprising a congestion determination threshold value setting unit which is provided in any one of said second and third communication devices which is provided with said congestion state determination unit, and sets a congestion determination threshold value which is a threshold value for determining whether or not said buffer unit is in a congestion state, wherein said congestion state determination unit determines whether or not said buffer unit is in a congestion state, on the basis of a measurement value of said data volume measured by said data measurement unit and said congestion determination threshold value set by said congestion determination threshold value setting unit.

(Supplementary Note 5)

The communication system according to any one of supplementary notes 1 to 4, comprising a congestion release determination unit which is provided in either of said second and third communication devices and, after said buffer unit is determined to be in a congestion state by said congestion state determination unit, determines whether or not the congestion state of said buffer unit is released, wherein said transmission unit sends data stored in said sending data storage unit to said second communication device, on the basis of a result of the determination by said congestion release determination unit.

(Supplementary Note 6)

The communication system according to supplementary note 5, wherein:

said congestion release determination unit is provided in said second communication device;

said second communication device is provided with a congestion release notification unit which, when said congestion release determination unit has determined that the congestion state of said buffer unit is released, notifies said third communication device of said buffer unit having been released from the congestion state, as congestion release information; and said transmission unit sends data stored in said sending data storage unit to said second communication device, on the basis of said congestion release information sent by said congestion release notification unit.

(Supplementary Note 7)

The communication system according to supplementary note 5, wherein said congestion release determination unit is provided in said third communication device.

(Supplementary Note 8)

The communication system according to any one of supplementary notes 5 to 7, comprising a congestion release threshold value setting unit which sets a congestion release threshold value which is a threshold value for determining whether or not the congestion state of said buffer unit is released, wherein said congestion release determination unit determines whether or not the congestion state of said buffer unit is released, on the basis of a measurement value of said data volume measured by said data measurement unit and said congestion release threshold value set by said congestion release threshold value setting unit.

(Supplementary Note 9)

The communication system according to supplementary notes 2 or 4, wherein:

said third communication device comprises a timer unit which measures the elapsed time since a reception of said congestion state information sent by said congestion state notification unit; and when said elapsed time measured by said timer unit reaches a time interval set in advance, said transmission unit sends data stored in said sending data storage unit to said second communication device at the same data volume rate as that in the state before receiving said congestion state information sent by said congestion state notification unit.

(Supplementary Note 10)

The communication system according to supplementary notes 9, wherein said timer unit measures the elapsed time since said congestion state determination unit determining that said buffer unit is in a congestion state.

(Supplementary Note 11)

The communication system according to any one of supplementary notes 1 to 10, wherein:

said first communication device is a mobile station device;

said second communication device is a base station device which sends data to said mobile station device within the communication area; and said third communication device is a core network device which is connected to the network and sends data to said base station device.

(Supplementary Note 12)

The communication system according to any one of supplementary notes 1 to 10, wherein:

said third communication device is a mobile station device;

said second communication device is a base station device which sends data to said mobile station device within the communication area; and said first communication device is a core network device which is connected to the network and sends data to said base station device.

(Supplementary Note 13)

A base station device comprising:

a buffer unit which stores inputted data temporarily; and a data measurement unit which measures the volume of data stored in said buffer unit;

wherein data from a core network device, which is sent in accordance with a result of determination of whether or not said buffer unit is in a congestion state on the basis of a measurement value of said data volume measured by said data measurement unit, is received and stored into said buffer unit.

The present invention has been described above with reference to the exemplary embodiments. The exemplary embodiments are just examples and, as long as not departing from the spirit of the present invention, various kinds of modification, addition/reduction and combining may be made to the above-described exemplary embodiments. It is apparent to those skilled in the art that modified examples obtained by those modifications, additions/reductions and combining are also included within the scope of the present invention.

This application is based upon and claims the benefit of priority from Japanese Patent Application No. 2011-147563, filed on Jul. 1, 2011, the disclosure of which is incorporated herein in its entirety by reference.

INDUSTRIAL APPLICABILITY

For example, the communication systems and the base station devices of the present invention can be applied to a mobile communication network such as of cellular phones.

The invention claimed is:

1. A communication system including a second communication device which sends data to a first communication device, and also including a third communication device which sends data to said second communication device, and also corresponding to PDCP (Packet Data Convergence Protocol), the communication system comprising:

a buffer unit which is provided in said second communication device comprising a processor and temporarily stores the data sent from said third communication device for the purpose of sending the data to said first communication device;

a data measurement unit which is executed by the processor in said second communication device and measures the volume of the data stored in said buffer unit;

a sending data storage unit which is provided in said third communication device and stores the data to be sent to said second communication device;

a transmission unit which is provided in said third communication device and sends the data stored in said sending data storage unit to said second communication device; and a congestion state determination unit which is executed by the processor in said second communication device and, on the basis of a measurement value of said data volume measured by said data measurement unit, determines whether or not said buffer unit is in a congestion state, wherein, said second communication device is provided with a congestion state notification unit, executed by the processor, which, when said congestion state determination unit has determined that said buffer unit is in a congestion state, notifies said third communication device of said buffer unit being in the congestion state, as congestion state information, by putting the information on a new message or a new parameter of the S1 Application protocol (S1-AP) or the GPRS Tunneling Protocol for User Plane (GTP-u), and wherein, said transmission unit sends the data stored in said sending data storage unit to said second communication device, on the basis of said congestion state information sent by said congestion state notification unit.

2. The communication system according to claim 1, further comprising a congestion determination threshold value setting unit which is executed by the processor in said second communication device, and sets a congestion determination threshold value which is a threshold value for determining whether or not said buffer unit is in a congestion state, wherein said congestion state determination unit determines whether or not said buffer unit is in a congestion state, on the basis of a measurement value of said data volume measured by said data measurement unit and said congestion determination threshold value set by said congestion determination threshold value setting unit.

3. The communication system according to claim 2, further comprising a congestion release determination unit which is provided in said second communication device and, after said buffer unit is determined to be in a congestion state by said congestion state determination unit, determines whether or not the congestion state of said buffer unit is released.

4. The communication system according to claim 1, further comprising a congestion release determination unit which is executed by the processor in said second communication device and, after said buffer unit is determined to be in a congestion state by said congestion state determination unit, determines whether or not the congestion state of said buffer unit is released, wherein said transmission unit sends the data stored in said sending data storage unit to said second communication device, on the basis of a result of the determination by said congestion release determination unit.

5. The communication system according to claim 4, wherein:

said congestion release determination unit is provided in said second communication device;

said second communication device is provided with a congestion release notification unit, executed by the processor, which, when said congestion release determination unit has determined that the congestion state of said buffer unit is released, notifies said third communication device of said buffer unit having been released from the congestion state, as congestion release information, by putting the information on a new message or a new parameter of the S1-AP or the GTP-u and said transmission unit sends the data stored in said sending data storage unit to said second communication device, on the basis of said congestion release information sent by said congestion release notification unit.

6. The communication system according to claim 4, further comprising a congestion release threshold value setting unit which is executed by the processor in said second communication device, and sets a congestion release threshold value which is a threshold value for determining whether or not the congestion state of said buffer unit is released, wherein said congestion release determination unit determines whether or not the congestion state of said buffer unit is released, on the basis of a measurement value of said data volume measured by said data measurement unit and said congestion release threshold value set by said congestion release threshold value setting unit.

7. The communication system according to claim 1, wherein:

said third communication device comprises a timer unit which measures an elapsed time since a reception of said congestion state information sent by said congestion state notification unit; and when said elapsed time measured by said timer unit reaches a time interval set in advance, said transmission unit sends the data stored in said sending data storage unit to said second communication device at the same data volume rate as that in the state before receiving said congestion state information sent by said congestion state notification unit.

* * * * *